March 13, 1962 E. P. G. WRIGHT ET AL 3,025,341
DATA PROCESSING SYSTEMS
Filed Feb. 4, 1959 18 Sheets-Sheet 1
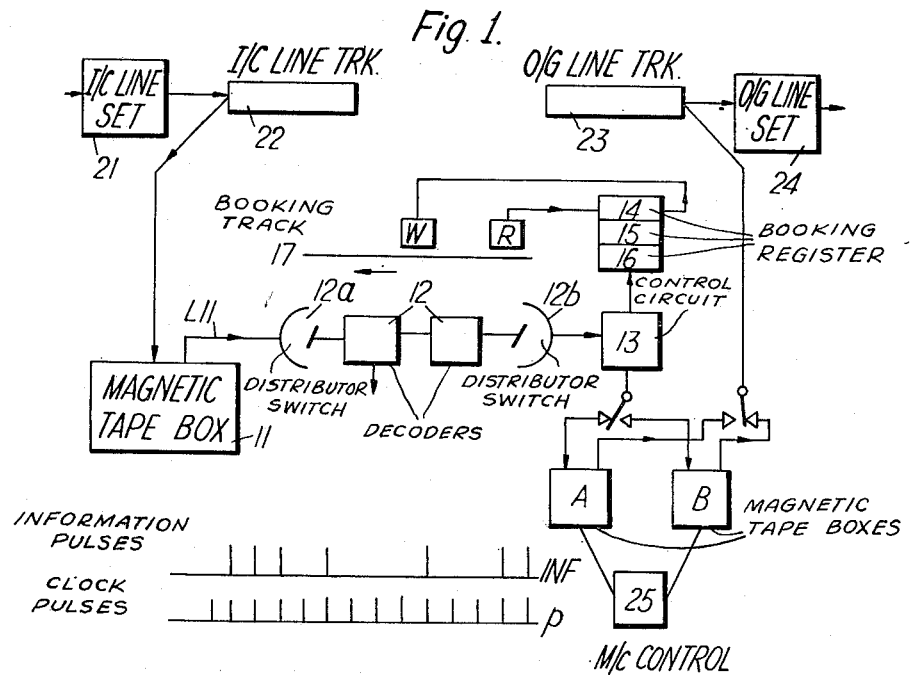
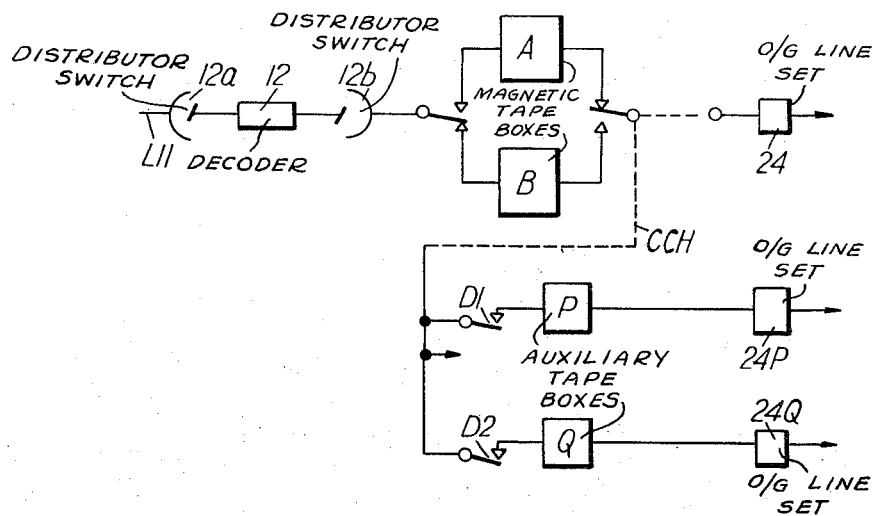
Inventor
E.P.G. WRIGHT-D.A.WEIR-R.C.P.HINTON-B.DZULA
By
Attorney

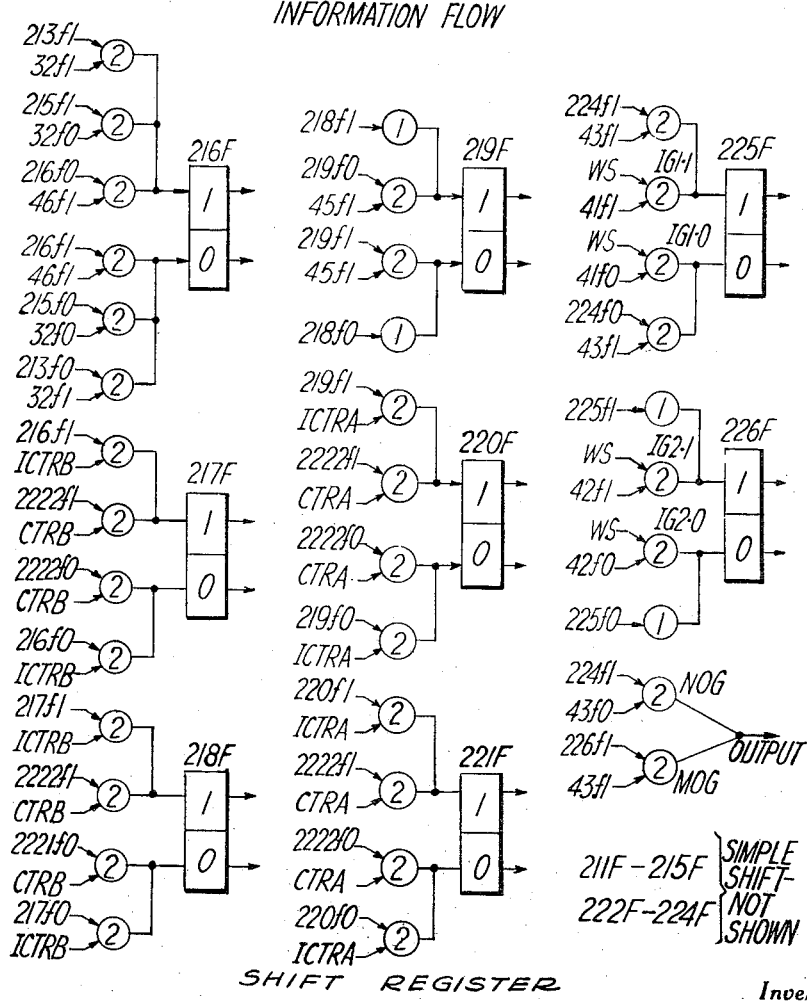

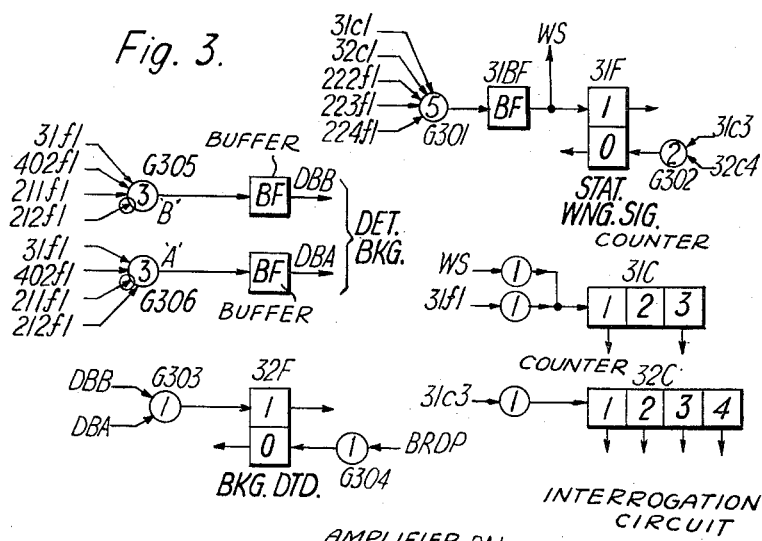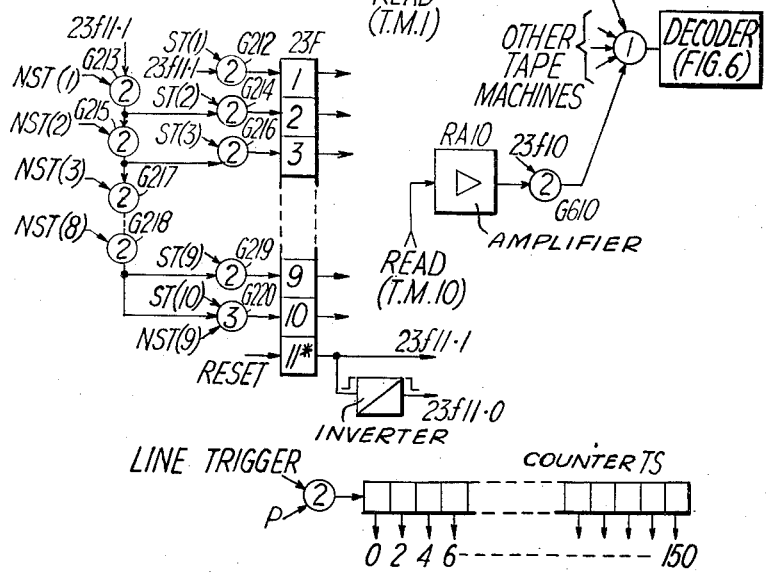

March 13, 1962 E. P. G. WRIGHT ET AL 3,025,341
DATA PROCESSING SYSTEMS
Filed Feb. 4, 1959 18 Sheets-Sheet 4
Fig. 4.
ADDITION AND SUBTRACTION CIRCUIT
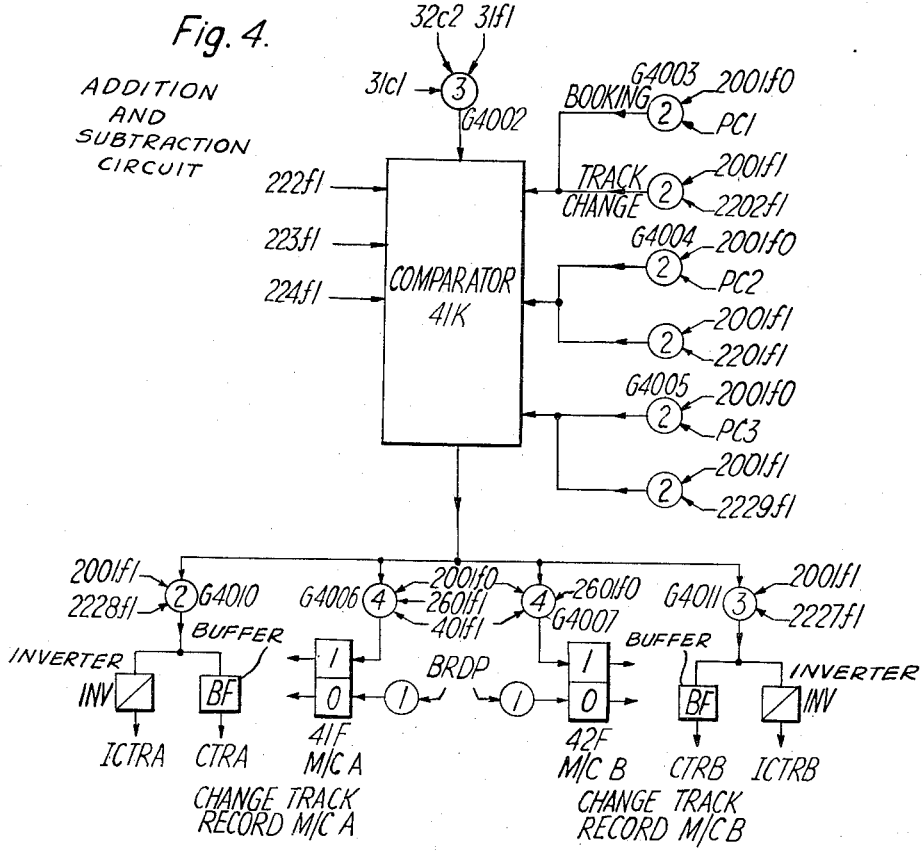
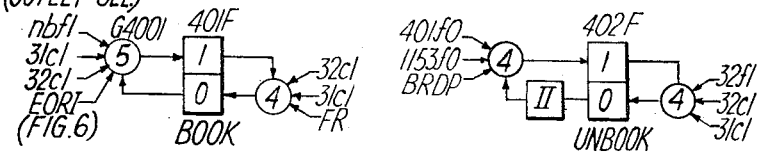
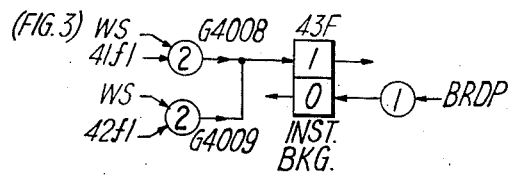
Inventor
E.P.G.WRIGHT–D.A.WEIR–R.C.P.HINTON–B.DZULA
By
Attorney

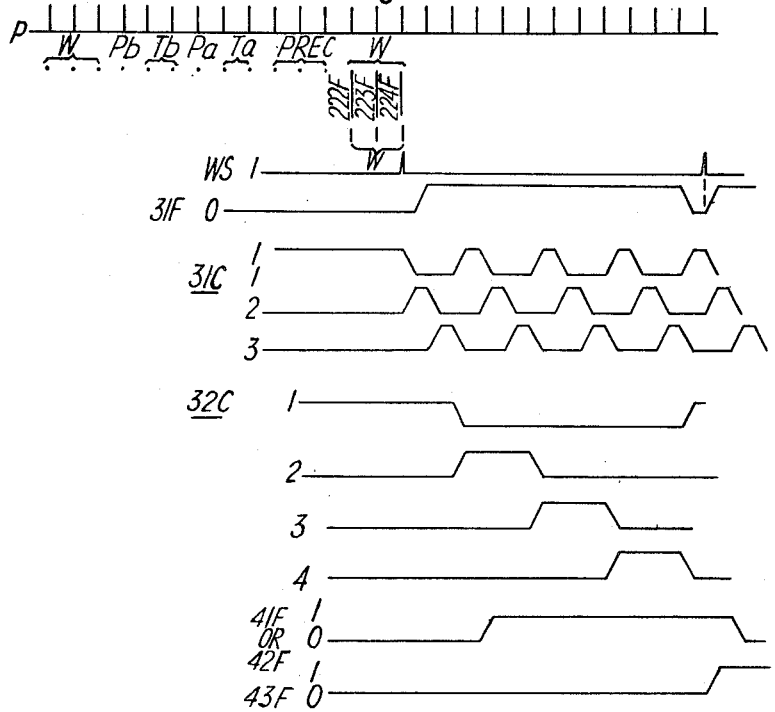

Fig. 5.

BOOKING CYCLE WAVEFORMS
1 DET. WARNING SIG. -WS
       OPERATE      31f1
2. " PRECEDENCE - 41f1 OR 42f1
3. " WARNING SIG. - WS       — INSERT BOOKING
              31f1 & 43f1 — CHANGE CIRCULATION
4 RESTORE NORMAL CIRCULATION AT DATUM PULSE
  NB. SYSTEM REQUIRES: (a) WARNING SIGNALS n+1 WHERE
     n IS N° OF PRECEDENCES;
  (b) TWO SPARE ELEMENTS AT "END" OF BOOKING TRACK
     SO THAT RESTORATION FROM "INSERT"DOES NOT
     CAUSE LOSS OF CONTENTS.

Inventor
E.P.G.WRIGHT-D.A.WEIR-R.C.P.HINTON-B.DZULA
By
Attorney

CONNECTING LINK CIRCUIT AND RECODER

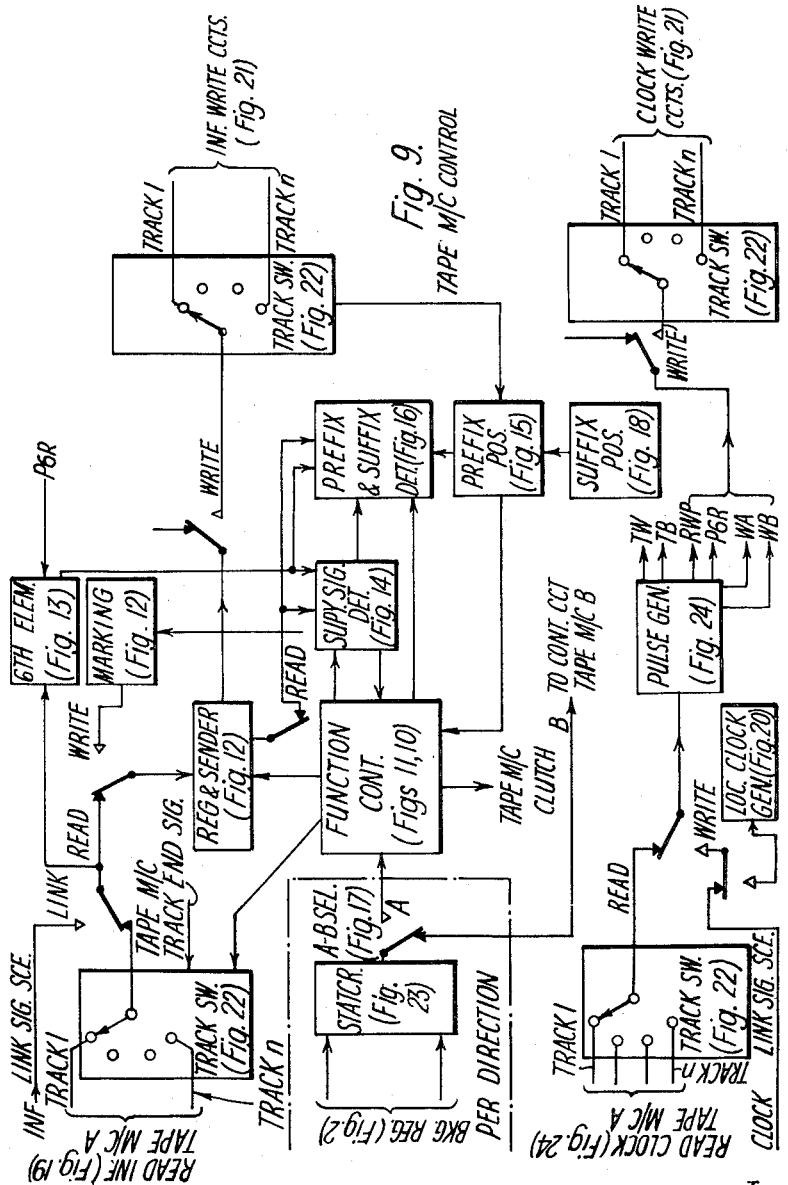

(Contd. from Fig. 11.)
FUNCTION CONTROLLER (Cont. in Fig. 10.)
FUNCTION CONTROLLER

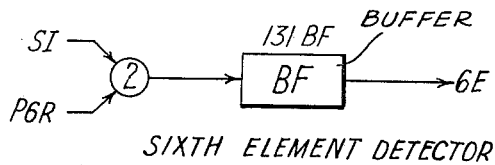
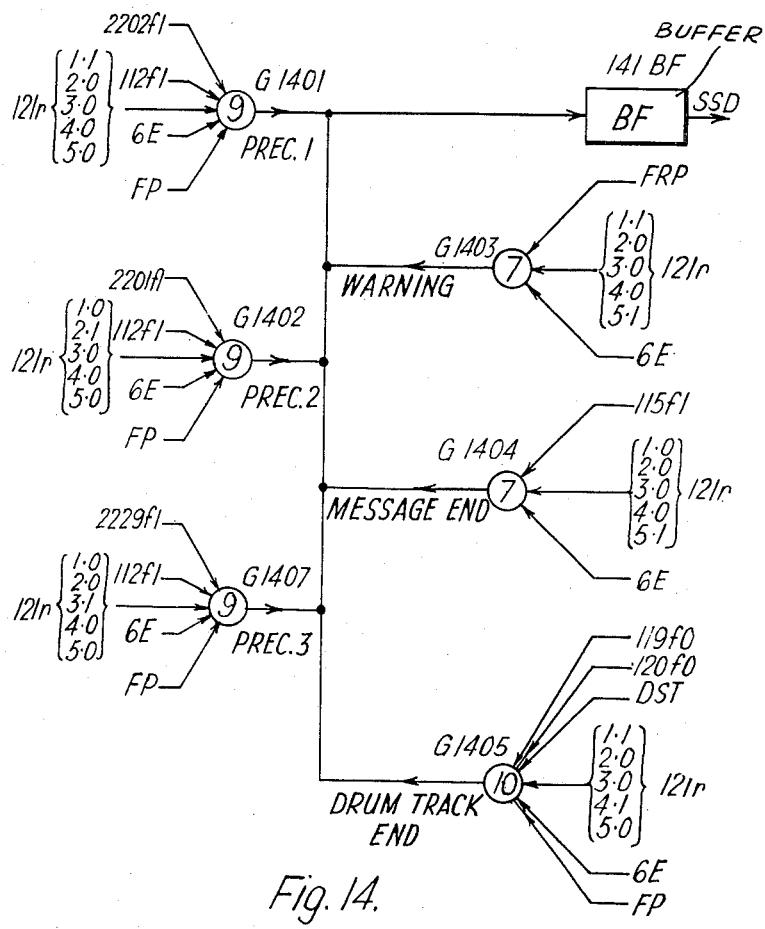

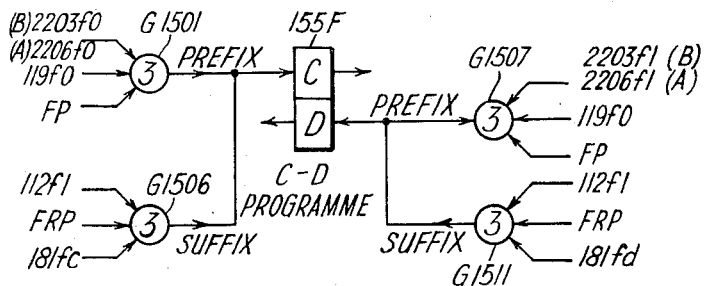
Fig. 15.
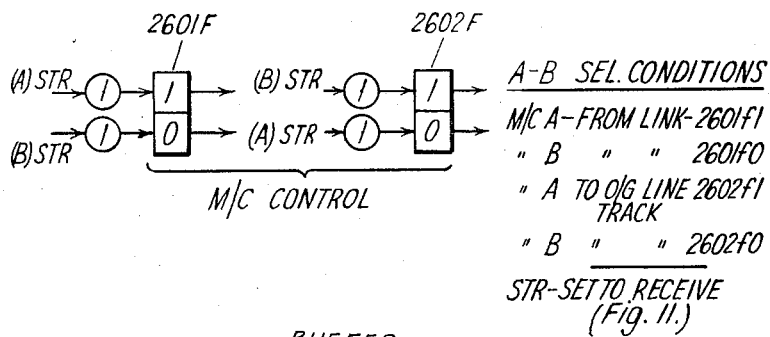
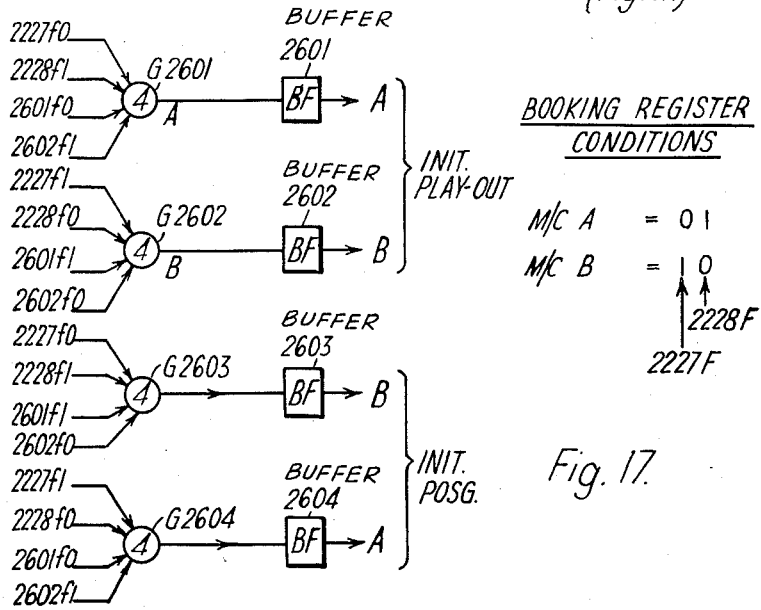
Fig. 17.

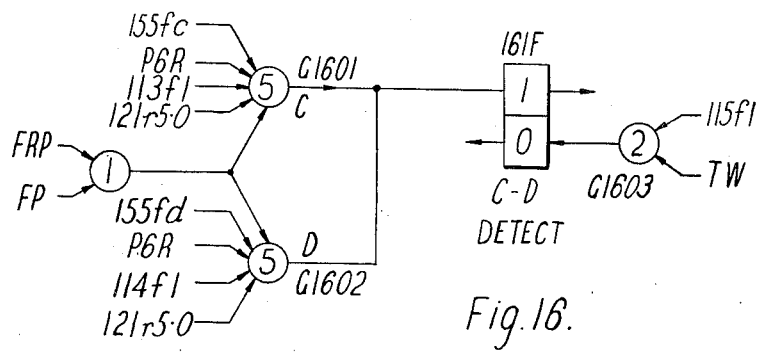
Fig. 16.
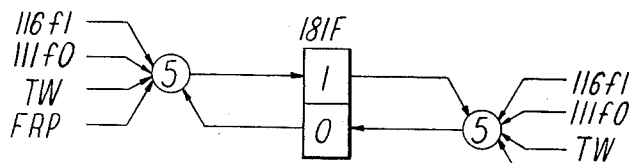
Fig. 18. SUFFIX POSITION
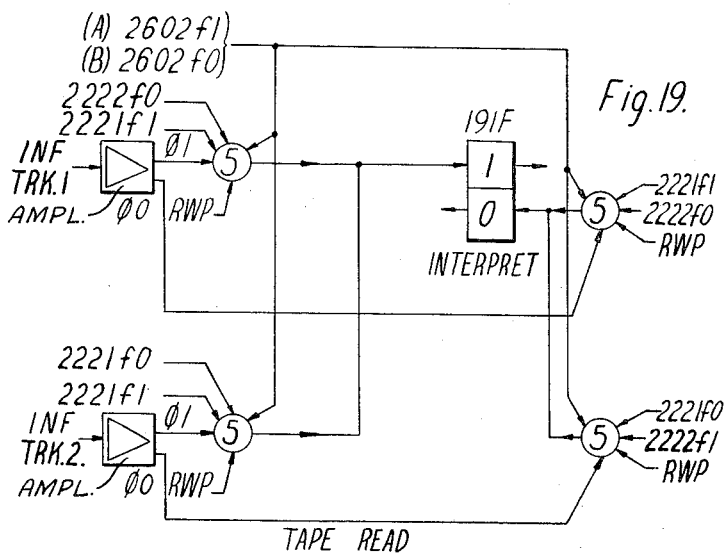
Fig. 19.
TAPE READ

PULSE GENERATOR

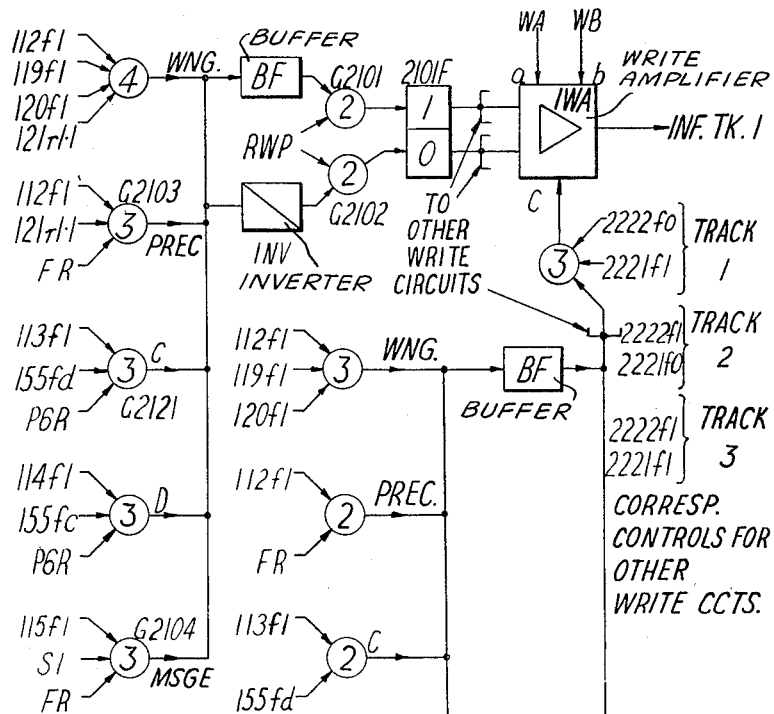
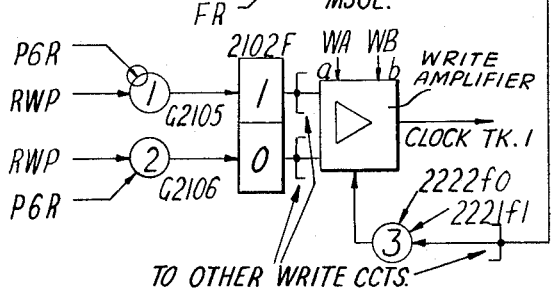
Fig. 21.
TAPE WRITING CIRCUITS

PHOTO-ELECTRIC DETECTOR

March 13, 1962  E. P. G. WRIGHT ET AL  3,025,341
DATA PROCESSING SYSTEMS
Filed Feb. 4, 1959  18 Sheets-Sheet 17
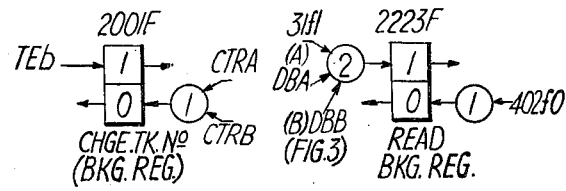
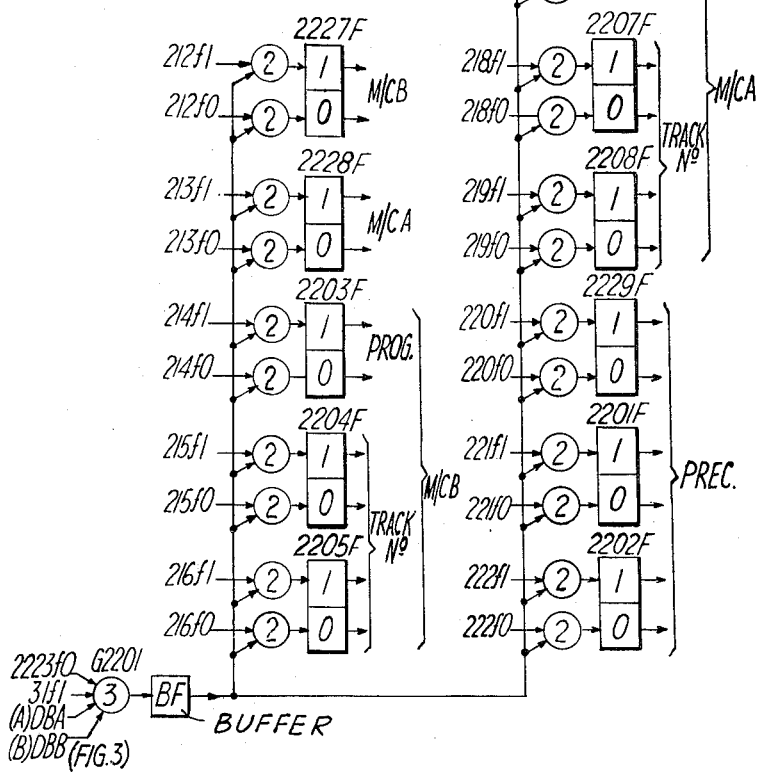
Fig. 23.
BKG. REG.
STAT'R.
Inventor
E.P.G.WRIGHT-D.A.WEIR-R.C.P.HINTON-B.DZULA
By
Attorney

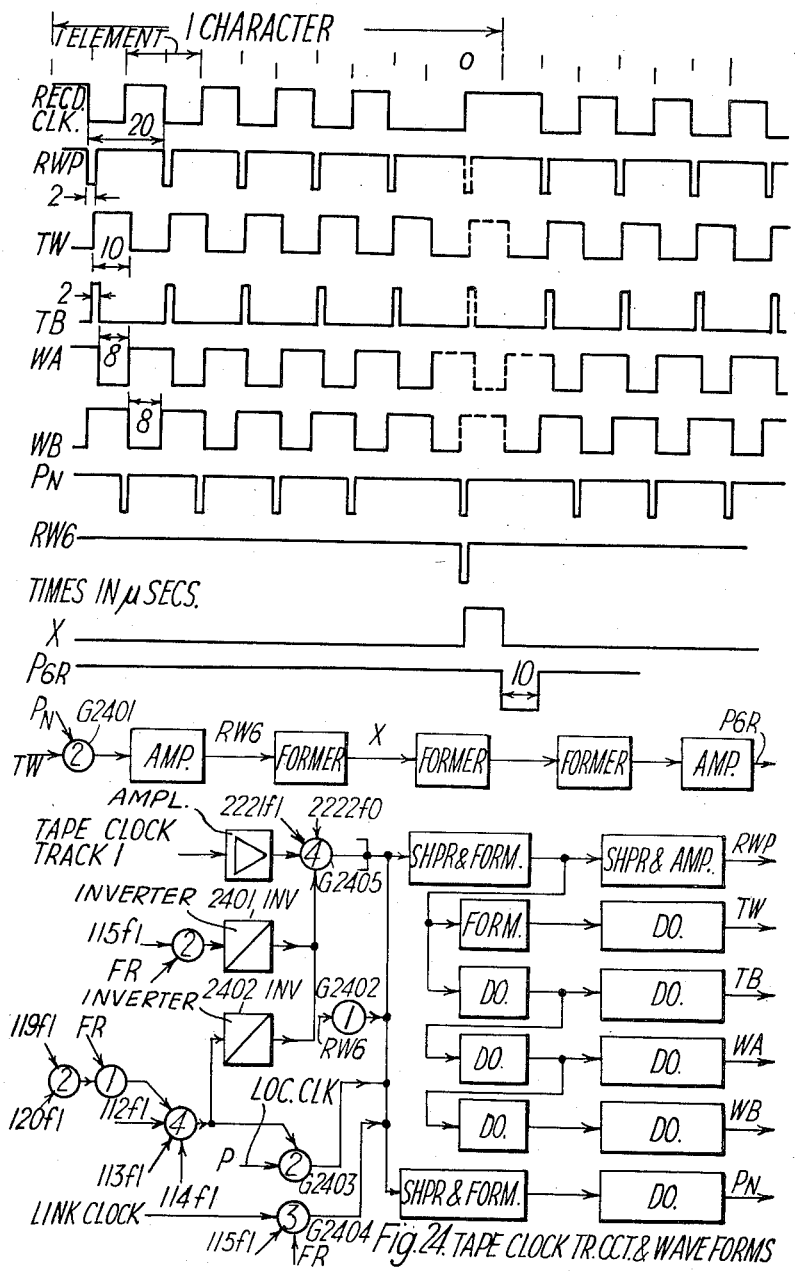

United States Patent Office 3,025,341
Patented Mar. 13, 1962

3,025,341
DATA PROCESSING SYSTEMS
Esmond Philip Goodwin Wright and Donald Adams Weir, London, England, and Raymond Cecil Price Hinton, Teaneck, and Boris Dzula, Clifton, N.J., assignors to International Standard Electric Corporation, New York, N.Y.
Filed Feb. 4, 1959, Ser. No. 791,188
Claims priority, application Great Britain Feb. 6, 1958
28 Claims. (Cl. 178—3)

This invention relates to data processing systems using storage, and particularly but not exclusively to telegraph switching systems of the storage type, such as described in the copending U.S. application No. 602,608, filed August 7, 1956, in which storage of every message passing through a switching centre and the processing of the message through the centre and its ultimate redistribution to one, or a plurality of destinations, as required, are carried out by the use of a booking register, in which particulars are entered of all messages passing through the centre and which controls, from information contained in each message, the ultimate re-distribution of the message from the centre.

Among other features, the invention relates to revertive control of transmission of information on a number of channels, lining up of booking information in order for retransmission in the booking register, the use of individual and common booking information, and the method of routing messages to the required outgoing directions.

The invention will be described with reference to the accompanying drawings comprising FIGS. 1 to 24, illustrating a preferred embodiment of a telegraph switching system, based on the use of magnetic tape for message stores and a magnetic drum for the booking register and ancillary purposes.

In the drawings:

FIG. 1 is a block diagram which shows the essentials of a storage telegraph system with booking register, and also shows pulse trains used in the operation of the register;

FIG. 2 shows a collection of binary trigger devices constituting a shift register as part of the booking register;

FIG. 3 shows the "interrogation control" of the booking register;

FIG. 4 shows the addition and subtraction control of the booking register;

FIG. 5 shows in graphical form, with waveforms used, the booking register cycle;

FIG. 7 shows the incoming line circuit;

FIG. 8 shows alternative outgoing line circuit arrangements to those of FIG. 1 for a group of lines to the same destination;

FIG. 9 is a block schematic diagram of the outgoing tape machine control circuit, the individual units of which are illustrated in the succeeding figures;

Figure 10:
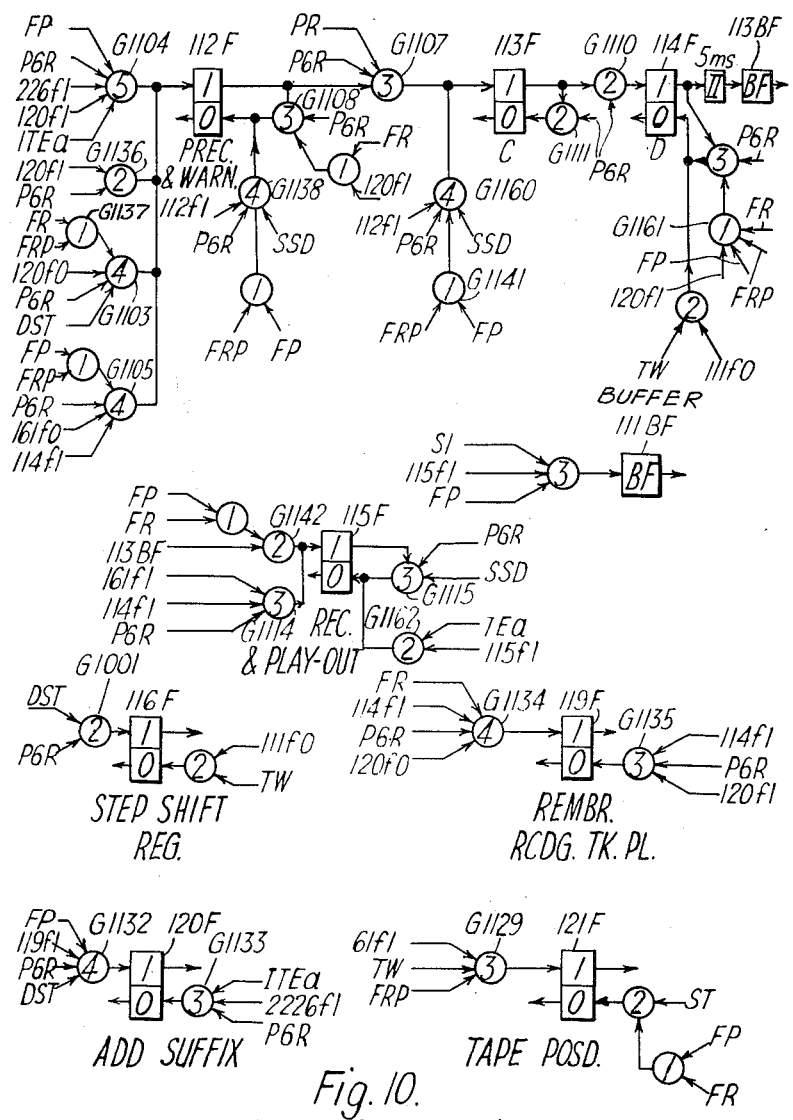
Figure 11:
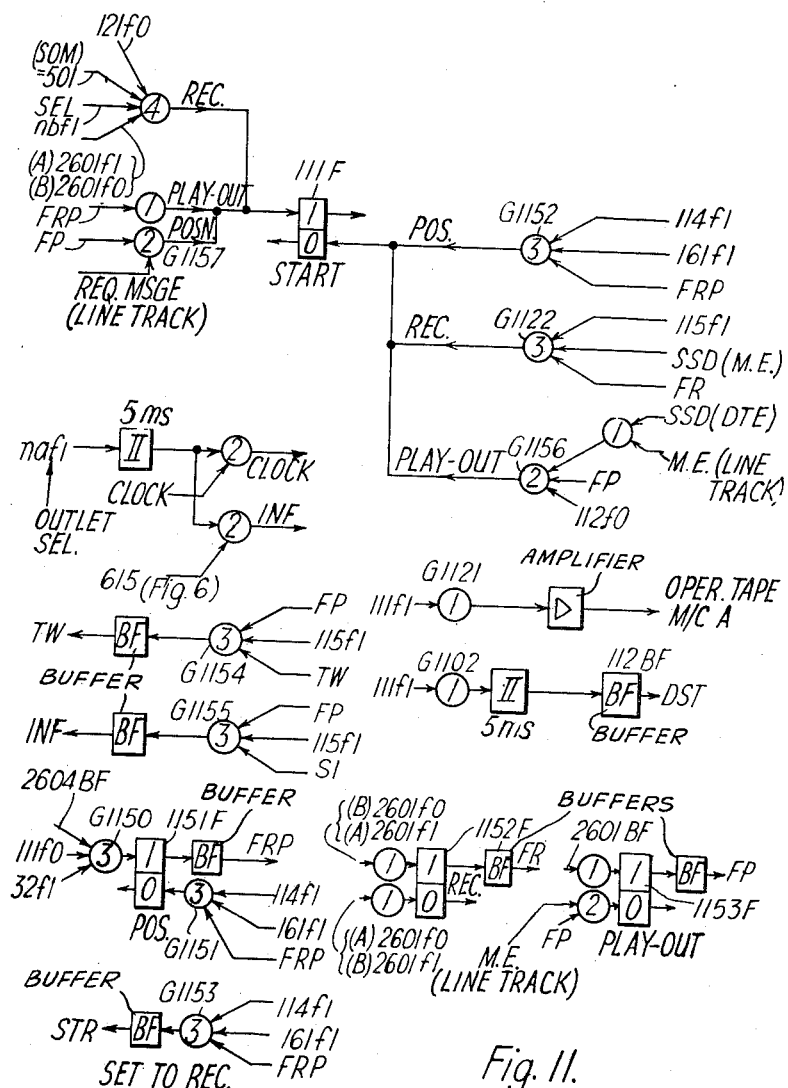
Figure 12:
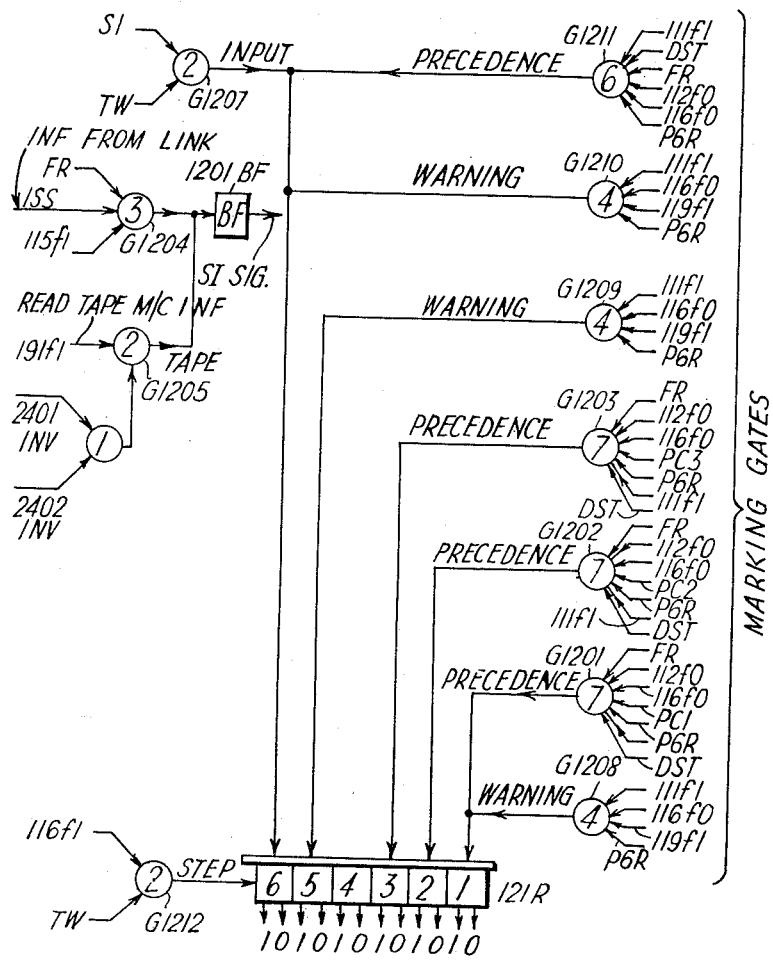
Figure 20:
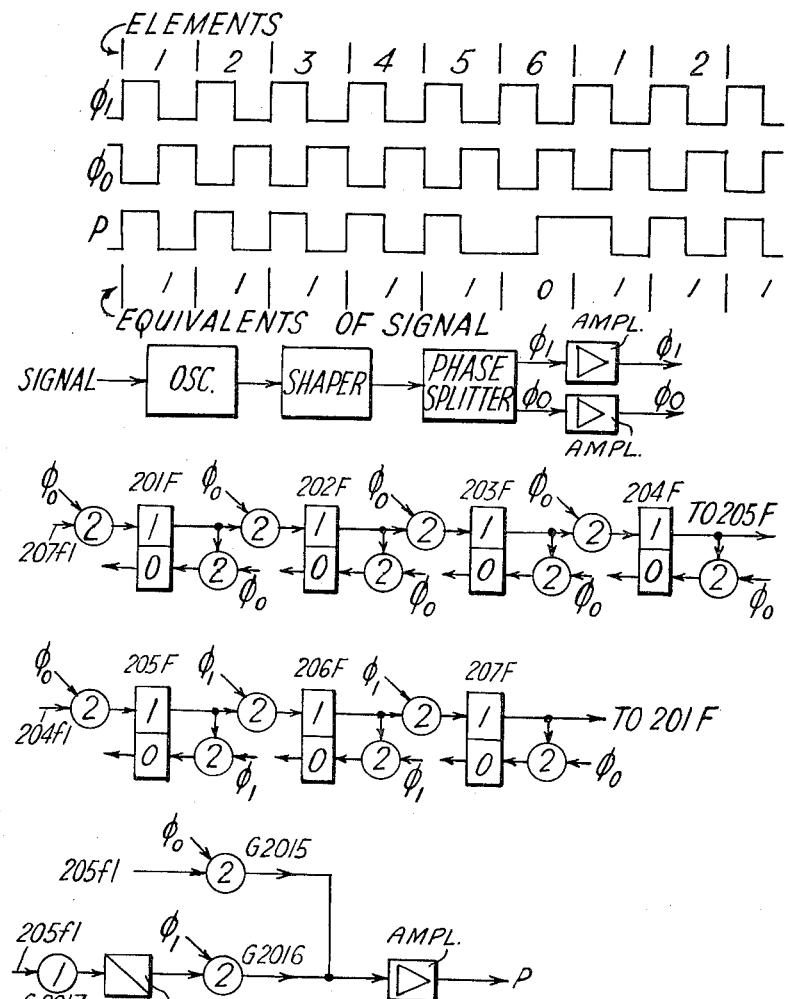
Figure 22:
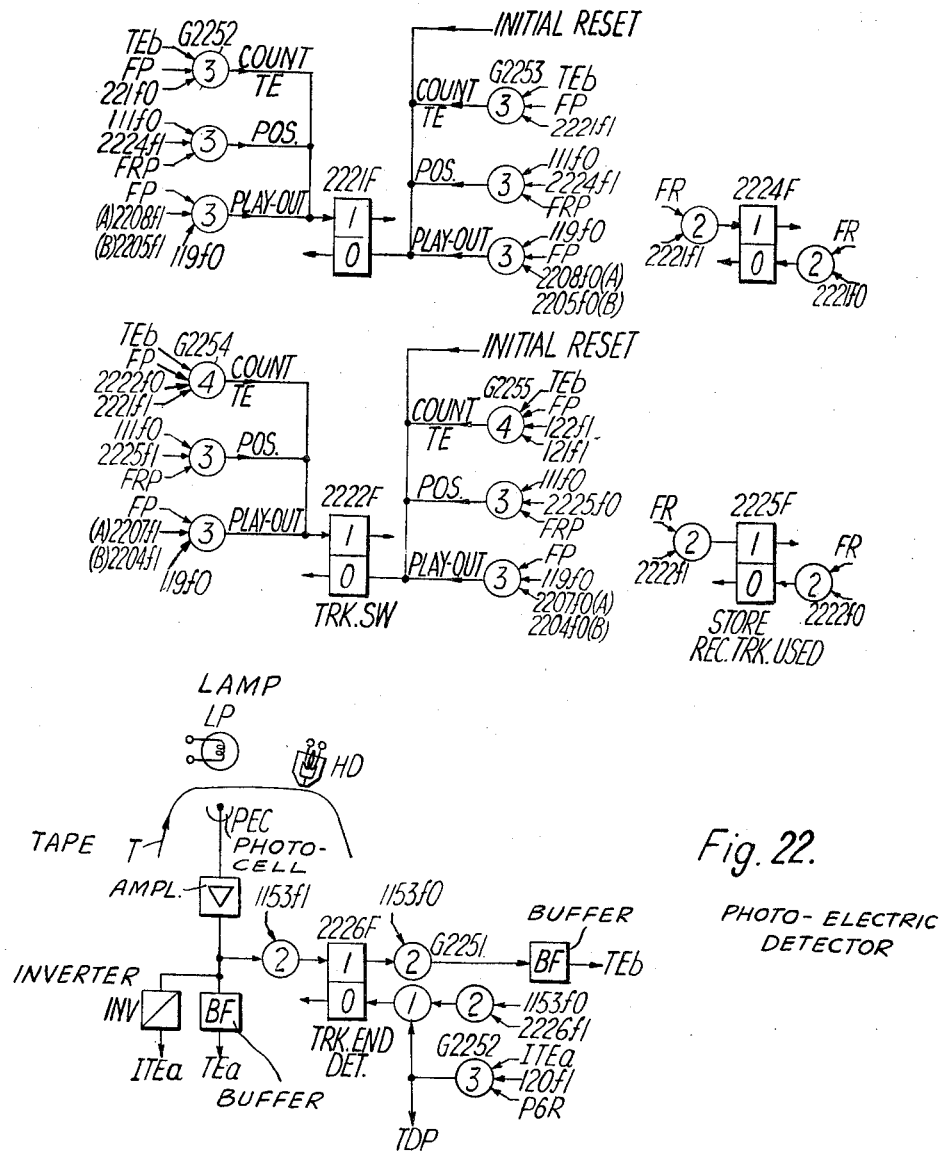

FIGS. 10 and 11 together constitute the function controller;

FIG. 12 is the register and sender for supervisory signal marking;

FIG. 13 is the 6th element detector;

FIG. 14 is the supervisory signal detector;

FIG. 15 controls the C—D programme (indicated as "prefix position" in FIG. 9);

FIG. 16 controls the detection of the C—D characters (indicated as "prefix and suffix detect" in FIG. 9);

FIG. 17 is the A—B selector, for determining which of the outgoing tape boxes is to be used for receiving;

FIG. 18 indicates suffix position;

FIG. 19 is a tape reading and interpreting circuit;

FIG. 20 is a pulse generator (indicated as "Local Clock Generator" in FIG. 9);

FIG. 21 is a tape writing circuit, for both information and clock signals;

FIG. 22 is a track switching and controlling circuit;

FIG. 23 is a booking register staticiser circuit, and

FIG. 24 is a tape clock track circuit and waveform generator (indicated as Pulse Generator in FIG. 9).

As far as possible, the first figure or first two figures of a reference number indicate the figure (as above) in which it may be found. FIGS. 10 and 11 contain references appropriate to FIG. 11; FIG. 17 contains references appropriate to a non-existent FIG. 26; and FIGS. 22 and 23 contain references appropriate to FIG. 22. FIG. 2, which has a large number of triggers (F) uses double figures for the identifying reference. FIG. 1 is a block diagram, and its references normally are purely numerical; consequently, any reference numeral which commences with a 1 refers to a figure in the double numbers between FIGS. 10 and 19, in general.

The figures have been prepared in functional diagram form, in which small numbered circles represent "AND" gates, except for those containing the figure 1, which represent "OR" gates. Gate references include the letter G. A small circle round the tip of a control to a gate represents an "inhibitory" control, generally derived as a positive control through an inverter. The latter is shown as a rectangle with a single diagonal, and the reference INV.

A buffer is shown as a small square with the reference BF. A trigger—2-position bistable register—is a vertical 2 x 1 rectangle divided horizontally into 1 and 0 portions (in general) and given an F reference. Controls from it are given an $f0$ or $f1$ reference following the identifying numbers. Counters and registers are shown as horizontal rectangles divided vertically into a series of squares, and given a C or R reference (as the case may be), with corresponding lower case letters for their outputs, used as controls. Amplifiers are shown with the conventional arrow-head symbol inside a square.

Referring now to FIG. 1 of the drawings, a message from an incoming line passes through an incoming line set 21, which changes the baud speed of the incoming information to a value compatible with the speed of an individual intermediate assembly store 22, designed to store a fixed number of teleprinter characters and consisting of a section of track on a magnetic drum. This track section when filled (or when containing a completed message—whichever happens first) transfers its content en bloc to a track on an individual incoming line store 11, which may comprise magnetic tape having several parallel tracks on the tape. Store 11 is capable of storing a number of complete messages from its associated line, or at least one complete message of estimated or predetermined maximum length, and is provided as an assembly and holding store for completed messages until they can be disposed of in required outgoing directions.

On the outgoing side, the process is reversed, and each outgoing line is provided with two magnetic tape stores A and B, either of which is used solely for transmission or reception at any one time, so that reception and transmission can take place simultaneously by means of these two stores, under control of the "machine control" 25. The two tape stores are arranged to communicate one at a time with an intermediate drum track store 23 which communicates with the corresponding outgoing line set 24.

The individual incoming tape stores 11 are connected to a distributor switch 12a forming part of a single link and decoder unit 12, which also comprises a second distributor switch 12b connected to storage control circuits each individual to an outgoing line arrangement.

The control circuits 13 are connected to the A and B stores individual to the same outgoing line and are also connected to individual booking register circuits 14, 15, 16 each provided with individual booking tracks 17 on the magnetic drum, and corresponding reading and writing devices R and W. This register may serve a number of outgoing directions by suitable distributor action.

It will be seen therefore that an incoming message via 21 is stored section by section in 22, the sections being transferred in turn to 11 to form a continuous message. The equipment 12 transfers messages on a rough time-division basis, messages from different lines being transferred successively in staggered relation, the distributors 12a and 12b making connection to the various incoming lines and to corresponding selected outgoing lines as required. The decoder 12 examines the routing information at the head of each message and determines the corresponding setting or settings for 12b which will be maintained throughout the transmission of that particular message. Distributor 12b is capable of being set to a plurality of different directions simultaneously for broadcast transmission of a message, so indicated by the analysis of the routing indicators. The circuit 13 transmits each completed message into one of the stores A or B for each required direction and then determines to which box the next message is to be sent. Circuit 13 also transfers booking information to the booking circuits 14, 15 and 16. This information consists of the precedence number for the message and the identity of the stores box A or B into which the message is being sent.

In general, the booking register is used in a storage telegraph switching system to serve three functions:

(1) To book each new message according to its precedence and chronological order;

(2) To determine the position in storage of the message next in order for retransmission and how it can be found; and (3) To eliminate the record of each booking as retransmission takes place.

The booking track 17 has a section individual to each outgoing line, each section being divided into sub-sections corresponding to the various precedence categories, and the circuits 13, 14, 15, 16, in response to the precedence category of the message being stored, cause the box information to be inserted in the next available position in the required category sub-section.

We have stated that a sub-section is allocated to each precedence category; this is an over-simplification, because in fact the location of the boundaries of these sub-sections is movable. Each set of bookings, each in a sub-section, will be headed by a category mark. Additional bookings will be interpolated between existing booking as required, the booking information of the next lower order being displaced to make room for the interpolated information in the required sub-section.

FIG. 1 also shows that information pulses INF are defined by clock pulses p derived from the drum, which may be common to a number of booking registers.

In order to employ the line circuit efficiently, the messages pass from the temporary incoming storage 11, into the decoder 12 at a high baud speed, and in consequence it is necessary that booking should be quickly effected; for example, the cross-office time for a short message may be only 100 ms. On the other hand a booking register may need to hold a record of many messages at once so that the store 17 needs to have a large digit capacity. If the data per message is kept very small, then the booking register can satisfactorily serve several different directions and thereby effect a valuable economy.

It will be realized that no central long-term store for holding all the messages incoming to the exchange is herein provided, and messages are held in the individual line store until transmission can be effected to the required outgoing individual line store or stores. This outgoing storage represents the only true long-term storage of the system, and transmission of a low precedence-category message may be held up at this point indefinitely in favour of higher precedence-category messages.

A transitional common store is provided in the common connecting link circuit where a single message may be held, though not necessarily in its entirety, during transmission from an incoming tape box to the tape boxes of selected outgoing directions while routing indicators are decoded and the required outgoing routes set up. This aspect of the system will be described in the next section.

Before going further into the question of booking the message and controlling retransmission, it is desirable to described the arrangements provided at the incoming and the outgoing sides of the system, and in the common connecting link circuit, bearing in mind that the storage in the tape boxes is an additional link in the chain of storage involved in the reception and retransmission of messages over that described in applicant's prior specifications.

Methods of transferring incoming messages via intermediate magnetic drum tracks are described in the noted copending U.S. application, Serial No. 602,608 and application, Serial No. 433,742, filed June 1, 1954. Methods of storage of incoming messages on magnetic tape are well known, and our British Patent No. 685,032 described a tape box comprising an endless band of magnetic tape of considerable length stored in a deep, narrow container, which is suitable for storing and retransmitting coded messages at high speed such as would be required for association with a drum track line assembly store.

A message incoming on a line circuit is recorded on the associated line track (22 in FIG. 1) in known manner, already described, for example, in the above-mentioned applications. In the arrangements therein described, the message is received, character by character, on an intermediate character "buffer" store, each character being transferred during the inter-character pause to the next character space in order on the individual line track.

Two cases arise: the first in which the individual incoming message is of a length less than the capacity of the line track (representing about 330 characters as a maximum), and is therefore fully received in the line track before a further transfer is required; and the second in which the line track is filled before the message has been completely received, and immediate transfer to the next storage stage is necessary.

The prior applications above referred to describe in detail the reception of a message under both conditions, and show that in either case the receipt of the "end-of-message" character or "line-store-full" element (PX), as the case may be is effective to set a trigger (bistable or multi-stable register) to generate a "storage required" signal (SRS). This in turn is effective to set up a common link circuit temporarily between the incoming line track requesting storage and a common storage track on the magnetic drum (selected on a 2-coordinate basis as being the next store available for use) and to cause rapid transfer of the contents of the line track to the storage track in the inter-character pause. In the present case, the requirements are a little different, since the line track 22 and tape box 11 are linked by an individual channel, and the "common store" is the next available track position on the magnetic tape. A further point of difference is that a "clock-track" must accompany, and be synchronized with, each individual significant recording of information on the tape for purposes of read-out control, a requirement which does not arise with a drum, which carries its own "clock-track" and runs continuously, wave-forms derived from the "clock-track" governing all recording and reading-out operations.

Figure 6:
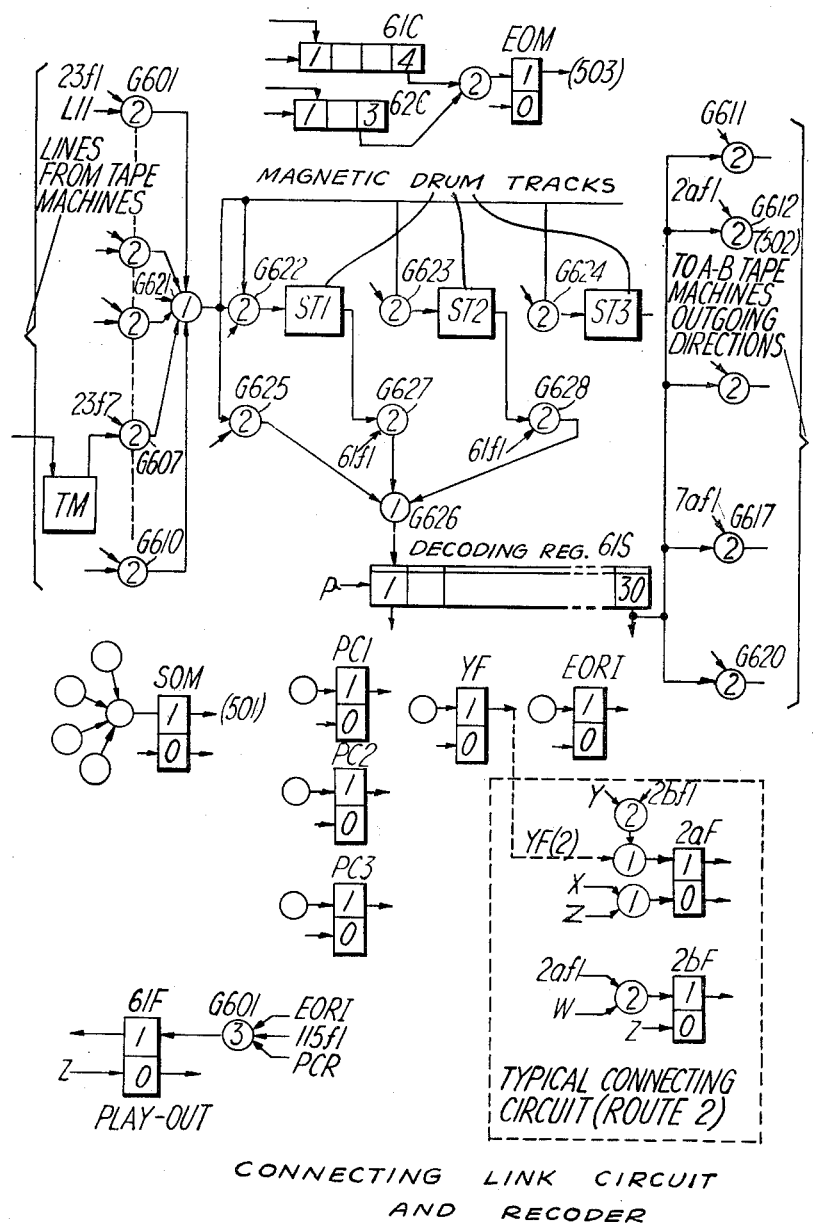
FIG. 6 shows the decoder circuit.

It is not the purpose of the present specification to describe this aspect of the data transmission system in hand, which is confined to the common link, booking and retransmission aspects principally. Methods for recording information on magnetic tape, are, as stated, well known, and it will be assumed that the incoming message has been transferred in toto on to the magnetic tape of the incoming tape box, together with a clock-track and a supervisory mark identifying the start of the message, and an "end-of-message" character identifying its termination. Tape boxes are provided with equipment for signalling the fact that they have information available for retransmission, and it will be assumed that these signals are applied to channels such as L11 (FIG. 1) so as to indicate on the distributor 12a the availability of information via that channel. In FIG. 6, channels such as L11 are connected to gates G601 . . . G610 individual to the various incoming tape machines, assuming an incoming group of ten lines.

In a manner similar to that disclosed in the noted applications, an incoming tape box having a message ready for retransmission and seeking the use of the common link and decoder circuit will generate a signal to open the corresponding one of the said gates in FIG. 6. FIG. 7 reproduces part of this figure, together with relevant portions of other figures, to give a composite figure of the link pre-empting circuit.

When an incoming tape machine seeks the use of the common link circuit, it generates one of the signals ST(1) . . . ST(10) (corresponding to the signals SRS of the prior specifications), and also its inverse signal NST by virtue of the individual inverter shown. Thus, for an equipment seeking transfer, ST becomes positive, and NST becomes zero; and for any other equipment ST is zero, and NST is positive.

At this time, the common equipment may already be engaged in a transfer for another line track and the new transfer will have to wait for the other to be completed. If, or when, the connecting link is free, the incoming line tape box circuits are examined in turn to find the one holding the waiting message, and when this circuit is found, a trigger associated with the line is operated to effect a unique connection to the first in numerical order of the calling lines which may be requesting transfer. This is effected in a line finder circuit forming part of FIG. 7, now to be described.

The indication that the common equipment is already engaged is given by the fact that 23f11.1 is at zero potential, i.e. the multi-stable register 23F is off its rest condition. This multi-stable register has a position associated with each tape machine, 23F1–23F10 respectively, for the assumed ten incoming line circuits, and one position, 23F11, indicating the "line track selector free" condition. As can be seen, the combination of gates G212–G220 includes the control 23f11.1, so that none of the gates can open when 23f11.1 is at zero potential, so preventing 23F from being moved to another position until a current transfer has been completed. When 23f11.1 becomes positive once again, indicating that the common equipment is in readiness for carrying out a further transfer, the gating arrangement G212–G220 is prepared for a new request.

Assume that line tracks 2 and 3 make a simultaneous request for transfer, no other line tracks making requests. G212 (for ST(1)—line 1) will remain closed but G213 will be open, for ST(1) will be at zero potential and NST(1) will be positive. A number in brackets after a reference indicates that there is a plurality of such references, one to each line, the number indicating the particular line. However, for line track 2, which is making a request, ST(2) is positive and NST(2) is at zero potential so that G214 is opened and G215 is closed. Although ST(3) is positive, the absence of a control from G215 prevents G216 from opening and NST(3) being at zero potential closes all the gates G217–G220 irrespective of other requests.

Thus, one only of the requests can cause the common equipment to become associated with a line track even for simultaneous requests. For the example given, G214 will energise 23f2, showing that the next transfer will be from line track 2; 23f11.1 will be at zero potential preventing further seizure of the equipment until the transfer indicated is completed.

Transfer of the message from the tape box indicated will then be initiated by a "tape transport" operation involving positioning of the tape for read-out, and the whole message, including heading, message, and "end of message" signal will pass into the decoder for temporary storage while the heading is decoded for priority and routing indicators.

The basic function of the decoding register (or decoder) is to examine the preamble of each message and to extract the information needed for switching purposes. To begin with, the message may be addressed to very many different lines, and it is necessary to determine by which routes all these lines are reached. Many of the addresses may be reached over a particular route to another centre, in which case, only one retransmission is necessary for all these addresses. The decoder also needs to sift the routing indicators to ensure that other centres are instructed by the message preamble in which directions they must retransmit the message. This means that certain of the indicators may need to be removed in retransmission, and that different indicators will need to be removed from each of the different retransmissions.

It is necessary that the incoming line indicator and serial number as well as the precedence indicator should be repeated on all retransmissions. As this information appears in the preamble to the message before the routing indicators, some form of storage is necessary while awaiting the decoding of the routing indicators.

As each distributing centre through which the message passes introduces an additional serial number, it is arranged that the decoding register ensures that only the last serial number to have been added is transmitted. By this means, the message length is not increased.

A further requirement concerns the recognition of the precedence indicator. Once this is recognised, it is stored and passed to each of the outgoing directions concerned in advance of the message, as well as in its normal position in the message. This action enables the booking register for each outgoing direction concerned to control the retransmission according to precedence in a simple manner, without further decoding.

The message may contain a single address, or several addresses, and since a message with a mutilated preamble needs to be routed untouched to a supervisor, it is necessary to withhold all retransmission until all the routing indicators have been examined, which requires facility for storing the preamble of the message in the decoder until all the routing indicators have been decoded.

To satisfy these requirements, the message is fed through a decoding device which identifies each routing indicator in turn and pre-empts a path in each direction required. Consequently, when all the routing indicators have been decoded, each of the directions involved in the retransmission will have been selected, but no part of the message will have passed to the outgoing tape boxes.

While the decoding is proceeding, the message passes into one or a series of stores in the decoder. As soon as all the routing indicators have been decoded, a reflex action causes the preamble of the message to pass again through the decoding device which ensures that common supervising information at the beginning of the preamble passes to all the directions already selected, while the succeeding routing indicators are passed to the selected directions only (which may prove to be the same for more than one of the indicators, if it leads to a further switching centre), and thereafter, the message is passed to all the selected directions, in parallel.

FIG. 6 shows a connecting link circuit and decoder in block form, and it is assumed that a message has to be passed from incoming line 7 to outgoing line 2. When line 7 is selected for transfer, the control 23f7 is operative and serves to open gate G607 to allow the message to pass from the tape box into the decoder via G621, where the information paths divide, going on the one hand into stores ST1, ST2, ST3, in order, and on the other hand via G625 and G626 into a thirty-position shift register 61S.

While the message is being stored (in a manner later to be described), decoding of the routing indicators in the preamble of the message takes place via 61S, in the manner described, for example, in co-pending application No. 971,798, filed February 5, 1959 or in the noted prior application No. 433,742, and are recognised in the triggers YF of FIG. 6. A typical trigger and its associated circuit for route 2 are shown in the panel below FIG. 6. The output from the decoder causes 2af1 to conduct, and this, in conjunction with a waveform W causes 2bf1 to conduct also. Thereafter, a waveform X immediately restores 2aF to position 0. When all the routing indicators have been examined, and End of Routing Indicators (EORI) has been detected, a waveform Y in conjunction with 2bf1 causes 2af1 to conduct again, thereby closing a path via G612 to one or other of the tape machines for direction 2. At the conclusion of the message transmission from the decoder stores, a waveform Z is generated to cause both 2aF and 2bF to be restored to position 0.

The waveforms W, X, Y and Z are not expressly shown, but their dependence on the time scale regulating the operations of the decoder will be obvious.

In the case of a multiple address message, e.g. for two addresses, to take the simplest case, there will be two pairs of triggers like the pair 2aF, 2bF, and all four will be operated on the first passage of the message head or preamble past the decoding register, the aF triggers being restored immediately by waveform X. With the detection of EORI, waveform Y reoperates the aF triggers to allow the message to pass simultaneously (in parallel) to both directions, i.e. to the selected outgoing tape boxes to await transmission in due course. If several indicators select one particular direction, the aF trigger will be operated and reset for each one. It will thus be seen that waveforms X and Y are common for all directions.

In the actual transmission, the preamble of the message passes through the decoder a second time, and is used in association with the waveforms X and Y to open and close the respective aF triggers, already prepared on the first transit, in accordance with the supervisory information to be passed. Thus, after the incoming line and serial number have passed to all selected directions, the waveform X restores the aF triggers to the 0 position, but when a routing indicator involving one of the selected directions appears, af1 is again caused to conduct (by the Y waveform) to allow this indicator to pass. Immediately afterwards, X restores aF to its 0 position. Similarly for the other indicators, and when all have passed to their respective directions, the waveform Y causes all the selected directions to be connected by operation of their respective aF triggers to af1 to allow the body of the message to pass to all the selected directions in parallel. At the conclusion of the message, "end-of-message" signal (EOM) causes waveform Z to restore all the triggers used, aF and bF, to their rest positions.

In FIG. 6, the decoding register shown as 61S may be identified, for example, with the set of registers 31S to 38S in FIG. 3 of the drawings accompanying the said copending application No. 971,798, while the individual registers, or triggers, shown as SOM, PC1, PC2, PC3, YF, EORI, EOM, correspond to the registers 51F, 52F, of FIG. 5 of the said drawings. These may be identified respectively as Start of Message, Precedence Category (1, 2, 3, etc.), Routing Indicator (YF—common part of a group of routing codes used), End of Routing Indicators, and End of Message. The latter is separately derived and recognised, as indicated by its association with a pair of counters 61C, 62C, by virtue of its being a large character combination.

The decoder storage device comprises a series of tracks on a magnetic drum, which are indicated as ST1, ST2, ST3. . . . An auxiliary track on the drum is used for supervisory and control purposes, and on the initial run, when the message passes from the selected incoming line to the decoder unit, the message passes to 61S (via G625) and to ST1 (via G622) in parallel, as previously noted. When ST1 is filled, after 1 revolution, G622 closes and G623 opens to allow the message to pass to ST2, and so on for further tracks. The process is similar to that described for the storage of messages in the common store in the noted application No. 602,608, and for the use therein of extension stores. Here, the extension stores to be used are predetermined, and the problem is to that extent simplified.

Decoding takes place while the stores are being successively filled, and in the case of a long message, is completed before the message is fully received and stored in the ST . . . stores. Retransmission to the selected directions takes place without delay, ST1 being emptied through 61S via G627, so that the message preamble is again presented to the decoder, as previously discussed.

When the contents of ST1 have been fully passed to the decoder, gate G628 opens, and G627 closes; and so on for successive ST stores, the output from 61S passing to the selected directions.

As stated earlier, the tape machines use two tracks for recording purposes, one for data (information) and a second for "clock" pulses, for synchronising purposes, and each track has a reading head and an amplifier. Thus G625 and G626 each represent two gates, the information passing via one of each pair and the clock pulses via the other, being applied in 61S, as shown, to advance the counter in normal shift register fashion.

The relative position of the drum when the information starts to arrive from the tape machine is random, and a supervisory mark is therefore made to record the beginning of each track. Furthermore, lack of synchronism in speed between the tape and the drum, though their speeds are nominally of the same order, makes it desirable to employ tracks on the drum in pairs, as on the tape, one for data and one for clock pulses. Since the drum is only an intermediate holding store between tape and tape, synchronism is unnecessary, provided each piece of information is accompanied by its own clock track.

Each store is controlled by a store trigger, here represented simply as gates, e.g., G622, G623 and so on, and in response to a start pulse from the line tape box selected, the ST1 store trigger is operated and so opens gates G622 and G625. When the drum has made one revolution and so filled store track No. 1, the start pulse is re-read from ST1 and combined with a clock pulse to obtain a coincidence which on termination operates a store trigger for ST2. To ensure that ST2 store trigger operates and no other subsequent one of the groups of ST stores, the coincidence also includes a control from No. 1 store trigger in its operated state—this condition being unique to the input of No. 2 store trigger. The result of No. 1 and No. 2 store triggers being opertated together is to open gate G623 and to close G622.

After the ensuing revolution of the drum, similar events take place in respect of ST3, G623 being opened uniquely by a control from No. 2 store trigger, the start pulse and a clock pulse.

When the End of Routing Indicators (EORI) is recognised in 61S and the associated triggers, No. 1 store trigger is reset on the next occurrence of the start pulse on the drum, and closes G622 and G625. With No. 2 store trigger still operated and No. 1 store trigger reset, conditions are established for opening G627 and information (and clock pulses) flow from ST1 to process the information again through 61S. On each subsequent revolution of the drum, another trigger is reset and a new gate (G628 or equivalent) opened in place of the previous one.

As soon as the No. 1 store trigger is reset, the End of Routing Indicators trigger must also be reset to prepare for its second operation, which is used to open the gates in the pre-empted directions for the broadcast retransmission of the message.

By the means just described, messages pass through the decoder circuit, where they undergo temporary storage, and pass out in parallel to the selected outgoing directions, represented by one or other of the A—B tape boxes feeding the transmitter for each direction. Storage at this point, as stated in an earlier passage, may be of indefinite duration, and the magnetic tapes of the outgoing storage devices A and B each have capacity for many hours of telegraph reception, which is provided by using several tracks on the tapes in sequence. This amount of storage is sufficient to retain all the messages dealt with during, for instance, a 24-hour period. When searching for a particular message to be retransmitted it will clearly be of advantage to indicate on which track it may be found (rather than having to search through all the tracks in sequence), and suitable switching arrangements are provided for this purpose.

As has been stated each outgoing line has two tape boxes, and each tape will have a number of parallel tracks arranged longitudinally with corresponding reading and writing heads. The purpose of the two boxes is to ensure that one box is always available to receive incoming messages even though message retransmission to a line from the other box may be in progress, so of course the particular box available for reception will change from time to time.

Messages recorded in one box are recorded serially on the different tracks in turn, so that a first track will be filled first before recording is started on a second track and so on. Provision is made to ensure that complete messages only are recorded on a track so that there is no problem of changing from one track to another during reception (and retransmission) of a message.

Whether a particular incoming message goes to one box or the other depends on the progress of message retransmission: in other words, the message will be inserted in the box which happens to be free at the moment. It is necessary each time a box is seized for reception to set the recording head to the end of the last message recorded on the track in use, and this is made possible by recording a special suffix signal at the end of the last message recorded, which is overprinted by the beginning of the next message, which in turn has a suffix applied after its termination.

No record is kept of the exact position of any particular message on the tapes, and it is, therefore, necessary to hunt for messages to be retransmitted. This is done on a precedence basis, the precedence to be used and the box to be examined being determined by the records in the booking register, as previously indicated.

Messages are not deleted from the tape on retransmission: they can remain on the tape for a 24 hour period, for example, for record purposes. This means that messages already sent have to be marked in some way to prevent them being sent twice (or more) inadvertently.

These varying conditions are taken care of by means of two supervisory mark identifying characters which can take various forms according to circumstances, as will be explained. Every message received from the link starts with a "warning" signal, followed by the precedence signal for the message, followed by the two supervisory mark characters, and then by the message as such.

The recording of information in a store of any character carries with it the implied necessity of being able to locate the recorded information at a later time for the purpose of read-out from the store, and thus the provision of suitable "indicators" for identifying sections of information becomes an important aspect of the storage process. In the case of magnetic recording systems of the type used herein, employing movable magnetic media, this problem of identification is part of the problem of the "transport" of the medium, and arrangements will be described for controlling the movement and positioning of the tape of a magnetic tape recording machine.

Magnetic tape machines are designed with tape transport from reel to reel or by means of a continuous loop. In the former case it is essential to reverse the tape transport when it is desired to read what has been recorded; in the latter case it is possible to arrange for the tape to be reversed or for it to be played round. In either case some form of control is necessary to transport the tape to the correct position to allow reading to commence. In some applications, it is necessary to indicate that a section of recorded information is being read out so that on subsequent examinations the sections which have already been read out may be distinguished from others which have not yet been read.

The problem of transport in magnetic drum machines has been previously solved by applicants by the provision of a single marking indicator which requires two transits of the drum for modifications to become effective. The problem has also been solved by the method of "read-and-write in one pass" in which the information may be read and modified during a single transit of the medium past a combined read/write head. It has been found, however, that such a recording method is not always suitable at relatively high packing density of information, i.e. where the length of the elementary signal in the medium is small. In the embodiment to be described herein, the recording method employed is that known as "phase modulation," in which the direction of change of a pulse form is used to indicate 1's and 0's respectively, and not the pulses themselves. Other methods of recording, such as "return to zero" and "telegraph" types of recording, could equally well be employed, however, without affecting the principle disclosed by the present invention. This principle is as follows:

In order to indicate a position, some unique signal must be written upon the magnetic medium. In searching for this position the unique signal must be detected, and when detected, modified, so that when the same unique signal is once again employed to indicate another position, this latter position may be found without ambiguity. As the reading of the unique signal and its modification cannot be effected at the same time, means must be provided to achieve the equivalent effect.

In the proposal it is assumed that the unique signal consists of two parts, C and D. Search is made alternately according to one or other of two searching programmes for the signal in the C part and for that in the D part. When search is made for the C part of the signal, the D part of all signals encountered as far as the wanted signal is modified unconditionally. When search is made for the D part of the signal (in the alternative programme) the C part is modified unconditionally.

When the unique signal is applied to the message, both C and D are, of course, unmodified. At the end of finding the message the D part, say, is modified. Next time a message of the same precedence category has to be searched for, the mode of operation will have reversed and the only unmodified D part of the unique signal will be associated with a message not previously detected; the message last dealt with will not be found because the D portion of the signal will have been modified at the time of the selection of the message. On this second cycle the C part would also be modified because the function is to modify unconditionally all C portions if searching for D portions, and vice versa.

Thus, at the end of two functional cycles, the unique signal will be completely deleted.

Such a signalling method may be used to distinguish any position on a tape. For instance it may precede a message so that a particular message may be found, or it may follow the last message recorded so that this point may be returned to, after, for instance, play-out of a selected message.

In the particular arrangement described the messages are distinguished by different precedence categories and on play-out it is required that the selection shall detect the first message in chronological sequence in the particular precedence indicated.

It will be appreciated that the C—D programme, as it may be called, must be individual to each category of use. For instance, if different categories of message have to be searched individually, the alternating C—D programmes must be unique to each category because one would otherwise affect the position indications of messages of other categories.

It will also be appreciated that the position indication must be truly a unique signal. Because of the unconditional modification feature it is necessary to precede the position indication by a warning signal which can be distinguished from any other intelligence which may be recorded on the tape. In the application described use is made of the normal 5-unit teleprinter code for recording the information. To discriminate the warning signal from other intelligence a sixth unit has been employed which, if at "one," indicates a supervisory signal, thus allowing the employment of any combination of the 5 units with the 6th unit at zero for intelligence, and any combination of the 5 units with the 6th unit at "one" for the supervisory signals, thereby providing effectively a "super-upper case" or "third-case" of signals. It is, therefore, convenient to employ the supervisory code for indicating the precedence category of a message as a prefix to the message and thus acting as a warning of the following C—D signals also. Similarly, as a suffix to the message, one of the supervisory signals may advise that the position indication follows.

Before use, the tape is wiped clean (magnetically), all previous messages being erased, and the medium is then processed in such a manner that the magnetic coating is left in a particular state of full positive or full negative, not magnetisation. In phase-modulation recording, the signals are recorded as complete transitions from full positive to full negative so that a start from neutral would give only half a signal for the first element recorded.

In the specific arrangement to be described, the tape provides both for the recording of information and also, on a parallel track, the recording of "clock" or control signals to allow interpretation of the information recorded. A further feature of the arrangement is that the tape is moved in one direction only, a continuous loop of tape being employed. However, the control features to be described could apply also to an arrangement in which the tape could be reversed, or to one which employed a reel of tape rather than a continuous loop, or to a magnetic drum.

The code of supervisory signals formed, as indicated above, as a "third case," may be employed for the indication of message end, or for any other special signal which must be detected.

Such a code might be devised in the following manner:

| Function | Code (elements) 1 6 | Numerical equivalent of 5 unit code |
|---|---|---|
| Spare | 000001 | 0 |
| precedence 1 | 100001 | 1 |
| precedence 2 | 010001 | 2 |
| precedence 3 | 110001 | 3 |
| precedence 4 | 001001 | 4 |
| precedence 5 | 101001 | 5 |
| precedence 6 | 011001 | 6 |
| Message end | 000011 | 16 |
| Warning | 100011 | 17 |
| Track end (drum) | 100101 | 9 |

The position indications (2 character supervisory marks) may be provided by the condition of two elements. However, because use is made of the same head for reading and writing, a certain time is necessary to allow the read amplifier to recover after receiving the writing signal. Hence these two elements are spaced by a character length, the 5th element of two consecutive characters being employed as the actual signals.

For retransmitting the next message in a particular precedence, the control circuit for the tape boxes will be told by the booking register which box to look in, which precedence to use, and on which track of the tape to start searching. This track information in the booking register is controlled from the box circuit for a closed-loop tape, the beginning of the selected track being marked by the termination of "end-of-track" signals, which are always provided.

An economical arrangement for the booking information can be achieved by an array including for each precedence in turn:

(1) A warning signal, heralding each precedence grouping;

(2) The precedence signal in code;

(3) Tape track and searching programme appropriate to the next message in box "A," which can be changed to relate to each successive message in box "A" as previous messages are dealt with.

(4) Tape track and searching programme appropriate to the next message in box "B," which can be changed to relate to each successive message in box "B" as previous messages are dealt with.

(5) Code signals indicating in which of the boxes, A and B, the successive messages to be transmitted will be found.

This arrangement does not record the tape track for each message at the time the message is booked, but it enables the first track of a box to be specified in the booking register until all the messages of that precedence group on the first track have been sent, at which time the track indication is changed under control of the tape box circuit to specify the second track, and so on.

In the following example of such an array:

KP1c2dabaababbba

K is the warning signal, P is the precedence category, 1c indicates that the next search in the A box should be made in the first track thereof with the "C" programme, whereas 2d indicates that for the next search in the B box the "D" programme should be used on the second track. The messages waiting must then be taken in chronological order from the A, B, A, A, B, A, B, B, B and A boxes.

It will be evident that the number of messages waiting of any particular precedence will be a random value depending on circumstances, and that a much larger storage capacity for the booking register will be needed if space is provided for the maximum number in each category rather than the maximum number in all categories taken together. For this reason it is desired to allow the different categories for each particular direction to appear consecutively in the store, it being understood that the extent of the record increases with each new booking made and decreases with each message sent, by interpolation and deletion respectively. Furthermore, a store 17 and its associated equipment 14, 15 and 16 can be used for several directions if the storage capacity for each direction is kept reasonably small.

The requirement now arises that it is essential that the various pieces of information can be correctly located for examination. This can be achieved by means of the warning signal, which is chosen to be unique. Thereafter, a fixed number of digits describe the precedence and the box conditions, and after that a variable number of pairs of digits describe the waiting messages, and the position of each discrete code is fixed in relation to the warning signal. It is essential that no combination of digit codes describing waiting messages should be mistaken for the warning signal. A large number of successive messages may be recorded in the same box and it is difficult to use any single digit arrangement for the box indication which will not, in course of time, form in combination the warning signal. However, if a message in the A box is indicated by the digits 01, and a message in the B box by the digits 10, then in no circumstances can there arise the combination 000 or 111 among the codes for the waiting message. The combinations appearing between the warning signal and the end of the B box searching programme ("$d$" in the example of an array given above) can safely include the same combination as the warning signal because together they have a fixed length and can be excluded from the examination for a warning signal by measurement immediately following detection of a true warning signal, but the box codes recording messages awaiting transmission must not simulate the warning signal. A code assignment can, therefore, be chosen as follows:

Warning signal _____ 111.
Precedence _____ 000, 001, 010, 011, 100, 101 or 111 (choice of eight).
"A" box track _____ 00, 01, 10 or 11 (choice of four).
"A" box programme ___ 0 or 1 (choice of two).
"B" box track and programme _____ As for A box.
Message in "A" box ___ 01.
Message in "B" box ____ 10.

A typical portion of a record in the booking register for precedence P (assumed to be 011) may, therefore, appear in code and binary form as follows:

| a b | K P 1 c 2 d a b a a b a b b b a | K |
|---|---|---|
| 01 10 | 111 011 00 0 01 1 01 10 01 01 10 01 10 10 10 01 | 111 |
| end of previous precedence register | Complete booking register for current precedence | Beginning of next precedence register |

When the tape boxes for an outgoing line are empty, its booking register will contain a sequence of sets of permanent booking information, each consisting of the first six items (KP1c2d) listed immediately above. The individual booking information for each message, which consists of Box number only, is interpolated in front of the warning signal for the next lower precedence, so that it becomes the last individual piece of booking information, for its own booking category.

The operational requirements of the booking register can be set down as followings:

(1) Booking _____To find the precedence category indicated by a new message and to interpolate an entry 01 or 10 depending on which box the new message is being inserted into.

(2) Find the booking information for the next message to be sent _____To find the first precedence category recording a waiting message, the box where the first waiting message for that category will be found, and the searching programme to be used.

(3) Removing the individual booking information of the last message sent___To find the precedence category concerned in the disposal of the last message sent and to remove the first message entry with this precedence. In addition, to change the programme for the the box concerned.

At certain times the register will be advised that, besides changing the programme, the track indicator must be advanced. All these operations are performed during a single examination of the register.

It will be realised that, if a simultaneous reading of a section of the booking register can be provided, such as $$\ldots b\,K\,P\,1\,c\,2\,d\,a\,\ldots$$

it is possible to carry out all the functions mentioned if allowance is made for the fact that the easiest way to add a "$b$" message, for example, for the precedence next higher than P is to find the P precedence because the entry needs to be made immediately above the warning signal for the P precedence. It follows that there must be a fictitious precedence below the lowest category in use or some equivalent arrangement to allow the insertion position to be recognised. (The K signal only of such a fictitious precedence is all that is needed.)

Before describing the circuits, the booking process will be illustrated in code form. On the left of the table below a sequence of different processes is given, partly in the form of questions, as applied to part of the booking register, that applying particularly to precedence P. On the right the state of affairs existing after each process is shown, the answer to the question or the action taken being indicated by the under-lined symbols:

| | |
|---|---|
| Present state of register ____ | KP1c2dabaababbbaKR4d3c |
| What is the next message? ___ | KP1c2dabaababbbaKR4d3c |
| "A" message sent, change "A" box programme _____ | KP1d2d baababbbaKR4d3c |
| What is next message? _____ | KP1d2dbaababbbaKR4d3c |
| "B" message sent, change "B" box programme _____ | KP1d2c aababbbaKR4d3c |
| What is next message? _____ | KP1d2caababbbaKR4d3c |
| "A" message sent, change "A" box programme and track __ | KP2c2c ababbbaKR4d3c |
| Add P message in "B" box ___ | KP2c2cababbbabKR4d3c |
| What is next message? _____ | KP2c2cababbbabKR4d3c | and so on, for each category in turn.

It is convenient at this stage to describe generally how the booking register works. It consists of certain tracks on a magnetic drum, each with associated writing and reading heads, and also comprise a pattern movement register 211F . . . 224F or 226F shown in FIG. 2. The drum is constantly rotating and the information thereon is constantly being extracted on to the pattern register through which the information passes in synchronism with the rotation of the drum so that information arriving at 224F can be passed to the corresponding writing head and back on to the correct position on the drum from which it was read, in well-known manner. The booking register is thus a dynamic store in which the contents are continuously circulating round the loop formed by the "revolver" or carrier track of a drum and the shift register formed by triggers 211F to 224F or 226F.

The information in each booking track includes the preliminary warning signal consisting of three consecutive "1" conditions, and FIG. 3 shows two triggers 31F, 32F which respectively detect the moment when this unique warning signal is recorded on triggers 222F . . . 224F, and at the same moment record respectively the condition of triggers 211F and 212F, which contain the indication of the first waiting message in the category concerned. The control gate by means of which this detection is carried out for 31F is also controlled by counters 31C, 32C, in their home positions (i.e. at 1), so that this trigger cannot be operated unless the counters are in the home position, and 32F is dependent on 31F at 1. This is to ensure that the information in the booking register arrives in proper sequence, since, as will be described, the counters 31C, 32C, together count the passage of a fixed number of element positions on the drum track past the reading head and so return to the home position at the moment when the new set of booking information for a further message arrives at a reading head.

Referring now in more detail to the equipment illustrated, FIGS. 2, 3 and 4 correspond to the blocks 14, 15 and 16 of the block diagram in FIG. 1. The top part of FIG. 2 is a functional representation of the pattern shift register, shown in greater detail in the lower part of FIG. 2, which shows how individual triggers of the chain 211F . . . 226F (FIG. 2) are interconnected to create a special purpose pattern shift register capable of handling interpolation and deletion. Not all the triggers are shown, since the first five, 211F–215F, perform a straightforward shift function only, in which the information in the trigger of lower denomination passes direct to the next higher trigger, as indicated for the "shift" functions associated with 219F and 226F. All of the triggers shown in detail include the shift function, but it is more complicated in these other triggers by reason of its being conditional on the presence of further controls. Similar remarks apply likewise to triggers 222F to 224F. The triggering of these devices is effected by controls applied through gates shown as numbered circles indicating the number of controls needed to open the gate, and includes implicitly a constantly recurring clockpulse "p" derived from the drum and serving to process the information through the register in step with the drum. This is indicated in the block portion of FIG. 2, but is omitted from the detail for reasons of clarity.

The first element 211F is fed by the reading amplifier from the store 17. The reading of a "1" (mark, M) causes 211f/1 to conduct whereas a "0" (space, S) causes 211f/0 to conduct; these operations are coincident with the reading of the clock pulses "p" read from the booking drum store. The "p" pulses, as just stated, are also employed for the normal shift operation, and there is an input to each side of each trigger depending on the condition of the corresponding side of the previous trigger. For 216F, however, this is further conditional on the state of the trigger 32F, which serves to discriminate between a shift from 215F (at 32/0) or a shift direct from 213F (at 32/1). This will be referred to again when describing deletion of a used booking. The output is normally taken from 224f/1 which will control what is normally rewritten in the store 17. When inserting a new booking into the register, this is stored at the appropriate moment in 225F and 226F, and output is temporarily transferred to 226F, a condition which is catered for by the pair of gates below 226F, which discriminates between 224f/1 and 226f/1 by the condition of a trigger 43F in FIG. 4, to be referred to later.

To get the picture quite clear, a section of the booking information for Precedence P stored in the register is reproduced in the upper portion of FIG. 2, and the condition of the triggers at the particular instant when the warning K has passed out of 224F is shown by the detailed information references in association with the corresponding selection of 1's and 0's. It must be understood that the booking information is inserted into 211F from left to right starting from K or 111. The detailed references refer, it must be understood, only to a transitory condition of the shift register, which is selected for the deletion of a used booking and the modification of the programme, and of the track number if necessary, for the corresponding box. In this condition, the warning K has already passed out of the register, and the code for P occupies 224F–222F; the A box track code occupies 221F and 220F; and so on, backwards through the register. The A box programme in the section of booking information shown is the C programme, represented by 0, so that 219F is in position 219/0. The first message in chronological order is recorded in 215F and 214F, which will be respectively at 0 and 1, because this message is in A box: this message is the next to be sent.

When the link decoder actuates an output trigger nbF to 1 (e.g. 2bF—see FIG. 6 inset), as previously described, the Book Trigger 401F (FIG. 4) is actuated to its 1 condition by gate G4001, provided the 12 way counter 31C–32C (FIG. 3) is in its rest condition and that the link has received the complete routing indicators (EORI is positive). 401f/1 conditions the booking register to receive a new booking, via 41F and 42F (FIG. 4).

The operation of nbf1 earlier extended a start condition to the A or B tape machine control circuit via gate G1101 (FIG. 11) and, dependent upon the position of the tape machine control triggers 2601F and 2602F (FIG. 17), actuates trigger 111F to 1.

The booking action to be described takes place simultaneously with the action of transfer of information to the tape machine assigned for its reception.

The control system must first recognise the "111" warning signal and then search for the precedence group designated by the triggers PC of the decoder (FIG. 6). The warning signal is detected by the buffer 31BF giving rise to the signal WS, and is staticised by 31F (FIG. 3). 31BF operates only when 222F to 224F are all at 1 and the counter 31C–32C is at rest. In this condition the intelligence contained in the shift register of figure 2 is three triggers earlier than that shown. 31BF (signal WS) permits the counter 31C–32C to drive and when 31F has changed to 1 the counter continues to drive. After three steps the precedence category is occupying triggers 222F to 224F; the counter will now be at 31C1–32C2 and hence the comparator 41K (FIG. 4) is enabled via G4002. 2601F (FIG. 23) is at 0 so that gates G4003, 4 and 5 (FIG. 4) open dependent upon the precedence of the message as decoded by PC1–3 and thus the contents of the precedence portion of the booking register (controls to left of comparator) are compared with the precedence of the new message (at the right).

When coincidence is established either G4006 or G4007 opens to trigger 41F or 42F to 1 dependent upon the position of the machine control triggers 2601F and 2602F.

It will be recalled that a record of the machine used is essential to the booking data and is, in fact the detail which constitutes the booking entry. In order that such an entry may be made in the correct phase, i.e. immediately after the last entry for the particular precedence concerned, the circulation path of the booking register must be increased by the two elements of the entry for the remaining cycle time of the booking register, starting at the appropriate point in the cycle. This point will be indicated by the arrival of the next warning signal and hence by the operation of buffer 31BF (signal WS) (FIG. 3) which now allows the gates IG1.1, IG1.0 or IG2.1, IG2.0 to open (FIG. 2) dependent upon the machine in use as indicated by 41F or 42F. Hence the booking is inserted by operating 225F or 226F to 1. 43F triggers to 1 via gate G4008 or G4009, also dependent upon 41F or 42F, and the operation of 31BF (WS signal). 43f/1 closes the normal output gate NOG (FIG. 2) and opens the modified output gate MOG, while permitting the output of 224F to be passed on to 225F in normal shift register manner. The condition continues until the cycle of the booking register is completed when a booking register datum pulse (BDRP), derived from a permanent marking on the drum track, restores the triggers 41F, 42F and 43F to 0. It will be clear that the contents of the booking register will in this way have been shifted by 2 elements after the new booking insertion so that the new entry will now be present with the remaining contents unaffected except for this shift.

The functioning described demands that the booking register preparation must provide a warning signal additional to the number of precedence categories and 2 spare elements prior to the datum pulse to allow the removal of the insertion triggers 225F and 226F without affecting the intelligence contained.

The description has been given for the case where a booking register serves a particular direction. The booking register arrangement can, of course, provide for a plurality of directions. One method of achieving such would be to time-assign different portions of the booking register to particular directions.

The booking action described takes place simultaneously with the action of transfer of information to the assigned tape machine.

The tape machine control circuit is indicated in FIG. 1 as a block 25, and shown in block schematic form in FIG. 9.

FIG. 9 shows the control equipment for one tape machine (A), with switched contacts in the chain-dotted enclosure (left) constituting the A—B selector which give access to a similar control circuit (the rest of the figure outside the enclosure) for the other type machine B. The centre block "Function Controller" (FIGS. 10 and 11) is virtually the heart of the tape box control, and controls, by its various responses, the basic tape functions of "positioning the tape," "reception of message," and "playout of message." The clock-pulse writing circuit at the bottom of the figure is shown quite separate, but in fact shares common controls with the information portion of the equipment. The diagram shows the relation of the various figures making up the whole, and is best described in relation to these figures, many of which consist solely of a single trigger and a pair of gates controlling it.

Control of the tape machines will now be described in more detail with reference to the appropriate figures, which are principally those in the range of FIGS. 10 to 24.

It will be remembered that the trigger 111F (FIG. 11) operated upon the initiation of the booking. This engages the tape machine clutch via a gate G1121 and following amplifier (FIG. 11), causing the tape to run. It is required that the intelligence to be recorded shall be preceded by:

Precedence Category marking;
Searching Programme (C or D).

The machine to be used for the recording of the message is determined by the position of the triggers 2601F and 2602F in the A—B selector of FIG. 17, which are set by the appropriate signals (A)STR or (B)STR received from the "set to receive" buffer of FIG. 11. The various possible conditions are provided for in the following manner:

(1) Receive from link on machine A__ 2601/1 operated.
(2) Receive from link on machine B__ 2601/0 operated.
(3) Transmit to outgoing line from machine A _____ 2602/1 operated.
(4) Transmit to outgoing line from machine B _____ 2602/0 operated.

Clearly, only two arrangements of the above conditions are possible, viz, (1) with (4), (2) with (3).

It will be assumed that tape machine A is assigned to receive the information from the link, in which case the tape machine B is now, or must be available for, transmitting to an outgoing line, and the conditions of the A—B selector triggers will be 2601/1, 2602/0.

The insertion of the prefix information referred to above is made in the following manner.

111/1 opens G1102 (FIG. 11), and after 5 ms. delay, the buffer 112BF produces the output signal "delayed start" (DST). The present function of tape box A is "Receive," and therefore 1152F (FIG. 11) is at 1, by virtue of the 2601F, 2602F controls, and the associated buffer BF is energised to give the signal FR, used extensively throughout the control circuit.

Reference to FIG. 24 will show that a special negative-going pulse P6R is generated for every sixth elementary signal pulse (in manner to be described hereafter), and the first P6R pulse to mature after the condition DST is established causes the precedence-and-warning trigger 112F to operate to 1. This is in FIG. 10, the operative gates being G1137 (for FR) and G1103. Simultaneously, the step shift register 116F operates to 1 via G1001, and also simultaneously, the precedence signal recorded on PC1, 2 and 3 of the decoder (FIG. 6) is marked into the shift register 121R (FIG. 12) via gates G1203, G1202 and G1201. A precedence marking is also made in position 6 of the register via gate G1211 irrespective of the PC code. Subsequently, when 116f1 has operated, normal pulses TW (see FIG. 24) via G1212 drive out the contents of 121R in position 1 and in its 1 phase (i.e. the signals are received from 121R1.1) to control the writing circuits of FIG. 21 for writing the precedence information on the tape track of the assigned box. This is effected in 112f1 via G2103, buffer BF or inverter INV, respective gates G2101, G2102 and writing staticiser 2101F, operated respective to its 1 or 0 position, which controls the Write amplifier IWA for the appropriate track on the tape as defined by the position of the track switch triggers 2221F and 2222F in FIG. 22. These are in a binary counting circuit and their setting for progressive counts determines the track in use.

Parallel, but somewhat simpler, arrangements are evident in FIG. 21 for impressing along with the precedence information signals, clock track signals on a separate clock track in synchronism with the information signals. FIG. 24 shows the various waveforms employed.

The writing circuits illustrated in FIG. 21 are arranged to deliver the required output for the so-called phase modulation recording system. In this method the signals are characterised by the direction of change of flux at the centre of the element. Two waveforms WA and WB are used to produce the required recording as shown in FIG. 24. A further input C enables the circuit to produce no output at all.

The next P6R pulse restores 112F to 0, via G1108, and operates 113F to 1, via G1107; at the next P6R, 113F restores to 0 and 114F operates to 1, via G1111 and G1110 respectively; and at the next P6R pulse, 114F restores to 0 via G1161, and 115F is triggered to 1 after 5 ms. delay, via 113BF and G1142. During 113f1 and 114f1, a series of 0's was written on the information track, but the operation also provided clock track for subsequent reading of a C—D character.

The machine is now ready to receive intelligence from the link, which it will commence to do when the end of routing indicators has been detected in FIG. 6 (EORI) and play-out trigger 61F has been triggered to 1, via G601 at the next P6R. This allows the contents of stores ST1, ST2 etc. in FIG. 6 to proceed in turn through G626 and shift register 61S, and emerge via gate G1204 and 1201BF (in FIG. 12) as signal SI to control the tape writing circuit at gate G2104 in FIG. 21.

A clock track to accompany the information is produced from the drum clock track (of stores ST1, 2 etc.) in accordance with the requirements of FIG. 24, the "clock from the link" being applied via G2404 to produce the requisite pulses P6R and RWP for FIG. 21. These are applied via G2105, G2106 so as to ensure that, upon read-out, the interpreted signal will be resynchronised at every group of six elements. This is achieved by writing 1's in every position except that of the 6th element of each character.

This state of affairs persists until "message end" signal is detected by the supervisory signal detector of FIG. 14, at G1404, and gives rise to the signal SSD via 141BF. SSD causes G1115 to open and so to restore 115F to 0 to end the writing operation. Note that the message from the link, in addition to passing to the writing circuit, passes in parallel to register 121R via G1207 in FIG. 12, into position 6 thereof, and the condition of 121R is constantly monitored for completed signals in the supervisory signal detector. The various gates in this detector are coded with various combinations of 121R outputs so as to respond respectively to the supervisory signal codes given in the table of codes quoted somewhat earlier. Thus, the code 121r (1.0, 2.0, 3.0, 4.0, 5.1) on G1404 corresponds to 00001, the basic code for "message end" while the 6th element "1" is provided by the 6E control derived from the buffer 131BF of FIG. 13.

The "message end" signal likewise causes the restoration of 111F to 0 via gate G1122, indicating the completion of the cycle of receiving operations. It should be observed that during the sequence of reading and writing operations just described, the trigger 119F—"Remember Recording Took Place"—operated to 1 under the control of 114/1, 120/0 and P6R, via G1134. The function of this trigger is to initiate the addition of suffix signals to the last message recorded when the machine is subsequently taken into use for playing out. This enables the end of the last recording to be found again when new recording is required to be done.

One of the aims of the system is to ensure that the oldest message of the highest precedence is handled first. Thus, upon the associated outgoing line becoming free, the booking register is searched to find that message which has the highest precedence and which was received first in that precedence. The booking register is so arranged that this may be accomplished in one scan of its contents provided detection commences only at the datum of the booking register so that the scan takes place in a recognised sequence.

When the machine control circuits complete the play-out of a particular message the trigger 111F is restored to 0 and, provided no booking action is taking place, the "un-book" trigger 402F moves to 1 upon the receipt of the booking register datum pulse BRDP from the drum track. 402/1 initiates the un-booking cycle.

With reference now to FIG. 2, the desired booking will be that which is characterised by the appearance of the warning signal (111) in positions 224F, 223F and 222F with the counter 31C and 32C at rest, and with a 1 in either 212F or 211F. When these conditions are satisfied, 31F triggers to 1 and 32F also triggers to 1, the latter due to G305 or G306 causing the emission of DBB or DBA and hence the opening of gate G303. So that the booking register may be freed for further bookings, the relevant contents are staticised in FIG. 23 under the control of the staticiser buffer which is actuated by the gate G2201. It will be seen that the relevant positions of the booking register shift register, FIG. 2, are displaced by one position from the point at which detection occurred, owing to the operating time of the triggers 31F and 32F. The machine to be used for the playing out of the message is indicated by the condition of triggers 2228F and 2227F. If the former is at 1, then machine A must be used; if the latter, then machine B must be employed. The precedence is contained in triggers 2202F, 2201F and 2229F; the track number and programme is contained in either 2208F, 2207F, 2206F (for machine A) or 2205F, 2204F, 2203F (for machine B). If the machine containing the required message is connected to the link, then a change must be made to free it (provided it is not in process of receiving), and so that at all times the link is able to initiate the transfer of a message, it must be arranged that the machine which is not required for the unbooking operation is switched first to enable it to be ready to receive from the link. This implies that the machine which is to be thus re-positioned has been engaged, as its last functional operation, in the play-out of a message, and its tape must therefore first be put into a position suitable for reception. This entails setting the track switch of this machine to the track last used for recording, and then searching the tape for the suffix signal in this track indicating the last receiving position.

The discrimination necessary is achieved by FIG. 17. If the machine demanded is already functionally positioned to allow play-out, then the appropriate one of the gates G2601 and G2602 will open to emit the "initiate playout" signal from 2601BF, for machine A, or 2602BF, for machine B. If the machine, however, is not suitably positioned for play-out, then one of the two buffers 2603BF or 2604BF will be actuated to initiate positioning of the machines. For instance, if the machine indicated for play-out by the entry in the booking register is A, but this machine is connected to receive from the link, the conditions will be as follows:

A—B Selector _____ 2601/1, 2602/0.
Booking Register _____ 2227/0.
Staticiser _____ 2228/1.

In this condition G2601 cannot open, but G2603 can open, and this initiates the triggering of 1151F of machine B to 1 to generate the Function Re-position Signal FRP. Note that FIG. 11 is drawn with controls relative to machine A. The procedure under such a condition of re-positioning demands the following:

(a) Re-positioning of machine B so that it may receive further intelligence from the link;

(b) Addition of suffix signals to machine A, at end of last message received.

The generation of FRP in machine B control circuit causes 111F to move to 1 and so initiate the re-positioning cycle. In this condition the circuit is arranged to search for the warning signal, and, having found this warning signal, to change one of the suffix positions dependent upon the programme stored in 181F. This programme is transferred during 112/1 to 155F via the appropriate one of the gates G1506 or G1511. 111/1 also operates the clutch of the tape machine and 5 ms. later the delayed start signal (DST) emerges from the buffer 112BF, and via G1103 operates the trigger 112F to 1. In this sequence position the circuits are set to read the output from the tape by tape reading circuit, FIG. 19. This circuit is adapted for reading from the selected track under control of 2221F and 2222F, choice of two tracks only being shown in FIG. 19. The phase-modulation system employed involves the necessity of interpreting the detected information according to the phase of current change detected. This would have the characteristics of $\phi 1$ and $\phi 0$ in FIG. 20, the interpretation being made by RWP of FIG. 24 and staticised by the interpreter 191F.

The signals from 191/1 are applied to buffer 1201BF via G1205 (FIG. 12) at times controlled by signals 2401INV derived from the clock track on the tape in FIG. 24, and appear as signals SI, for application via G1207 to 121R in position 6. In this way, the detection of the warning signal by gate G1403 is effected (FIG. 14), so that when the contents of 121R correspond to the warning signal, (100011) 141BF emits the signal SSD and so, via G1160, triggers 113F to 1, restoring 112F to 0 via G1138. If the reading programme is such that the C character should be modified unconditionally and the D character read, then 155F will be at position D so that gate G2121 of FIG. 21 opens to write ones in the first 5 elements of the C position, P6R inhibiting writing during the 6th element. The same P6R causes 114F to move to 1 and retores 113F to 0. In this sequence position the D character is examined for 0 output by the C—D detection trigger 161F via gate G1602. If 0 is found in the 5th element position, then this gate opens and triggers 161F to 1, but if the examined character is at other than 0 in the 5th element the sequence 112F, 113F, 114F is repeated due to G1105 re-triggering 112F while G1161 restores 114F to 0. The function continues until 0 is detected in the D character, when G1114 opens to trigger 115F to 1 and at the same time 1151F is restored to 0 via G1151, while G1152 restores 111F to 0 completing the function and arresting the tape.

The machine is thus brought to rest in a condition to receive from the link.

The restoration of 111F to 0 causes 181F to change its state, thereby assuring that subsequent suffix usage will be such that writing must take place in the "D" character, reading in the "C" character.

The condition which restored 1151F also opens gate G1153 and causes the emission of the STR signal (set to receive) which, because it originates from machine B, triggers 2601F to 0 and 2602F to 1. This is the condition required for machine A to play out and thus the gate G2601 now opens to energise 2601BF which thus triggers 1153F of machine A to 1 and so initiates playout function FP. FP triggers 111F to 1 to initiate the playout cycle, but, as the trigger 119F will be at 1, because previous recording is assumed to have taken place, the preliminary function of adding the suffix signals to indicate the point at which recording ceased must ensue. Similarly, the identity of the track previously used for recording must be recorded and stored, and this is achieved by the "store receive track used" triggers 2224F and 2225F which were set during the previous recording function. FP, via G1132, triggers 120F to 1 and so in turn opens G1136 to trigger 112F to 1 and initiate the suffix character addition cycle. It will be seen that G1208, G1209, and G1210 established the warning signal code in 121R upon the operation of 111f1 so that writing of the warning signal may take place in the 112f1 condition. At the P6R condition which follows, 112F is restored to 0 while 113F is triggered to 1.

At the next P6R the sequence will switch to 114f1 with 113f0. During these two character positions clock track will be written on the tape with a series of noughts on the information track, thus providing means for subsequent operation of the C—D programme. 114f1, after 5 ms. delay, initiates 113BF which causes G1142 to open and so trigger 115F to 1. Meanwhile 114F is restored to 0 via G1161. Simultaneously 119F is restored to 0. In this condition the tape continues to run until a "track end" signal, due to a photo-electric detector (FIG. 22), triggers 2226F to 1. In this arrangement, the moving tape T normally interrupts a beam of light from lamp LP in its passage to a photo-electric cell PEC, until near the end of the track, where a series of windows, not shown, are inserted into the tape and allow the light to pass. The signal generated is amplified and passed through a buffer BF and inverter INV to produce signals TEa and ITEa respectively. The point at which search should commence is indicated by the cessation of the "track end" signal, when ITEa becomes positive (by inversion) to restore 2226F to 0 at G2252 and 120F to 0 at G1133. In this unique condition G1104 opens to trigger 112F to 1. When the track end was detected, the TEa signal restored 115F to 0 via G1162. The output of G2252 provides the "Tape Datum Pulse" TDP.

119f0 allowed the track number stored by 2207F and 2208F to be transferred to the track switch triggers 2221F and 2222F. With 112f1 the tape is searched by the supervisory signal detector (FIG. 14) for the precedence indicated by the triggers 2202F, 2201F and 2229F. When coincidence of the read precedence signal with the stored precedence indication occurs, 141BF gives the output SSD which triggers 113F to 1 restoring 112F to 0. The search to see if this is the first untransmitted message in the category now takes place under the control of the C—D programme trigger 155F. This is set according to the staticiser Programme Trigger 2206F (via gate G1501 or G1507). 155F controls the C—D detector 161F. If 155F is at its C position, then G1601 looks for the absence of a one in the 5th element position of the C character under the control of 113f1. On the next P6R which matures, 113F is restored to 0 and 114F triggered. If 161F triggered to 1, then the search is complete and G1114 opens to trigger 115F to 1; but if 161F did not find the condition sought, the cycle repeats via G1105 which re-triggers 112F to 1 to search again for a message having the requisite precedence category.

With 115f1 operating, gates G1154, G1155 open to extend the information and clock track from the tape to the outgoing line track circuit 23 and 24 of FIG. 1, whence the information will be transmitted a drum track-load at a time, as described in the noted prior application No. 602,608. The condition will then continue until the first drum track load of information has been transferred, when G1156 opens to restore 111F to 0. Upon another drum track load being required, G1157 will be opened to re-trigger 111F to 1 and so re-engage the tape machine clutch to playout further information. The operation continues until the line circuit detects "the message-end" signal, when 1153F and 111F are restored to 0. In this condition another request is made to the booking register for a message by the re-operation of 402F to 1.

*Track Change*

In the course of playing out messages the condition will eventually arise when the last message on a track has been discharged, in which case it is incumbent upon the control circuit to modify the track number already in the booking register. This is achieved through the cooperation of the track end detector 2226F and the track switch triggers 2221F and 2222F. 2226F triggers to 1 on the detection of track end, and, when the message has been fully discharged, 1153f0 allows G2251 to open and emit the "track end" signal TEb. This is applied to the track switch triggers via gates G2252, G2253, G2254, G2255 so that the number stored in these triggers is advanced by one. TEb also triggers the "change booking register track number" trigger 2001F (FIG. 23) to 1 which switches the input controls to the comparator 41K so that the condition searched for is the precedence used in the last unbooking function. Thus, when coincidence is achieved, the conditions permit emission of CTRA or CTRB via gates G4010 or G4011 dependent upon the machine which was employed for the previous unbooking. Whichever signal matures modifies the triggers containing the appropriate track number, i.e. 221F, 220F or 218F, 217F which receive the number stored in the track switch triggers 2221F and 2222F dependent upon the function of CTRA or CTRB, either of which restores the trigger 2001F to 0, thus completing the track change function.

*Clock Track Waveforms*

Little has been said up to now concerning the problems which must be faced when reading from, and writing on, a magnetic tape. FIG. 24 illustrates in detail the method by which a clock track, when read, may be used to produce the necessary control waveforms, and also shows the conditions which apply when a clock track has to be written on the tape. In such a condition, the pulse generator of FIG. 20 will provide the necessary control wave forms.

The arrangements rely upon a clock track accompanying the intelligence to interpret that intelligence. This clock track provides the pulse source from which all the waveforms used are derived. These are shown in FIG. 24 as are also the means for deriving them from the clock signals.

Because the characters are recorded serially upon the tape in the form of 6 elements per character and because these characters must be interpreted as explained earlier, it is essential that a strict synchronism of the interrogating pulses and the clock source be maintained; if an element were to be slipped then no intelligence could be interpreted. To ensure that no such slip can permanently prevent true reading, the clock track recorded shows a characteristic difference at the sixth element position so that this may afford a resynchronising signal to the system.

It will be seen that the recording in the phase modulation method provides for "1" at all intelligence elements and a "zero" at the sixth element position. The pulse arrangement detect the negative edge of the squared clock output and produce pulses RWP which feed pulse formers TW and TB while the latter feeds to WA and WA feeds WB. Thus all these pulses are based on the negative front edge of the squared signal.

The positive going signals initiate negative pulses PN. At the sixth element position, only PN is generated. At all other positions the TW pulse consequent upon RWP inhibits G2401 not allowing PN to pass, but at the sixth position, TW pulse, being nagative, allows PN to mature to give rise to RW6 and thus, through the forming and shaping circuits, to produce P6R. P6R is thus a unique pulse for the sixth element which ensures synchronisation.

RW6 acts via G2402 to trigger off the normal pulse train and produce a pseudo-pulse RWP so that one of each kind of pulse is produced for each element.

TW is the normal circuit-controlling-pulse on the rising back edge of which the trigger conditions change; TB is a pulse to enable (activate) the buffer circuits; WA and WB are the writing waveforms to give the phase modulation demanded.

The clock signals are shown as derived from a number of tracks, dependent upon the track switch 2221F, 2222F, and upon the particular function.

It will be appreciated that the clock track accompanies the information received. Also that when precedence and position signals must be added, a clock track must be generated and added also. Gate G2403 admits the locally generated clock track (P) when this is required; this is obtained from FIG. 20 where the generated oscillation is squared and phase split to provide two outputs $\phi_0$ and $\phi_1$. With the aid of a closed-circuit counter 101F—107F (as described below) a similar waveform to the normal clock is provided so that the pulse system functions in the normal manner. This local clock is required only during the function of writing the special signals such as precedence, warning and position.

In FIG. 20, the generation of $\phi_0$ and $\phi_1$ is carried out in well-known manner that is clear from the figure. In the counter, every trigger but one is normally at zero, the operated state travelling through the series starting from 201F, say, primed by 207f1 while the latter was triggered. Each trigger, therefore, operates to the 1-state of the previous trigger and successive pulses of the $\phi_0$ series. The clock series P is derived from the $\phi_1$ series and 205f1 applied via G2016 and G2017 respectively; 205f1 is normally at zero, but the inverter following G2017 converts this to a positive output, so generating via G2016 the waveform P in phase with $\phi_1$ except at 205f1. When 205F triggers to 1 during each cycle, a phase reversal takes place in P, which responds to $\phi_0$ via G2015 instead of to $\phi_1$, 205f1 being now operated, thus giving the anomaly shown in the P waveform. This waveform is employed in FIG. 24 when required, as determined by the function triggers 116f0 or 120f1.

*Outgoing Traffic*

If the amount of traffic for a particular direction is sufficiently large, it will be necessary to provide two or more outgoing lines in parallel for the one direction. When this number of lines in the same direction becomes sufficiently large, it is possible to economise on the number of tape boxes provided for the direction as a whole by providing a common pair of A and B boxes, fed in the manner described above for a single outgoing line, and in turn feeding a single channel connecting via a distributor to a group of tape boxes, one for each of the outgoing lines in the same direction. This arrangement is shown in FIG. 8 which shows part of the block schematic of FIG. 1 modified to illustrate this technique. Line L11 comes from the incoming magnetic tape box of an incoming line to the link circuit 12a, 12b comprising the decoder 12. Each outgoing channel from 12b is connected as before to two tape boxes A, B. The connection from these tape boxes to an individual outgoing line circuit 24 will not be provided in the case of a group of lines in the same direction but the outlet from the tape boxes will be connected to a common channel CCH, in turn connected via distributor equipment D1, D2, . . . to individual tape boxes P, Q . . . each of which serves an outgoing line circuit 24P, 24Q, . . . of one of the lines of the group. The transmission of messages via the link circuit to the boxes A and B will take place in exactly the same manner as described above, and the retransmission from A and B will also be controlled by the booking register in exactly the same manner as described above.

The distributor D1, D2 . . . will be controlled in any desired manner to maintain a connection to an idle individual tape box P, Q . . . . The individual tape box will be arranged to retransmit messages received thereby in the order of reception. The controls for these boxes will be arranged to provide suffixes and supervisory marks as in the case of the boxes A, B, so that the reception of messages, and the retransmission of messages can be adequately controlled.

With this arrangement the transfer from the individual boxes to the outgoing lines is at teleprinter speed, but the transfer from the A or B box to an individual box P, Q, . . . can be fast. Although the message can be transferred at the same speed as for the transfer through the link, there may be a considerable time needed for tape transport before or after the transfer. Approximate times may be, for example, as follows:

Into A or B _____seconds__  1
A or B to P or Q _____do____ 20
Out of P or Q _____minutes__ 10

It will be apparent that all the messages trensmitted over each circuit will pass through the associated auxiliary store P, Q . . . and if a record of the message transmitted is required it is available here in a convenient form.

It is possible to make a substantial improvement in the overall effective capacity of all the boxes by a small sacrifice in the precedence order of retransmission. If one or both of the two lowest categories of precedence are allowed to flow from the stores A and B to the auxiliary stores it can still be ensured by suitable precedence control on the tape that none of these messages are passed to any circuit while there are any messages of higher priority waiting. The sequence from each auxiliary box would remain correct but there would result some minor loss of sequence between low category messages in the different boxes.

While the principles of the invention have been described above in connection with specific embodiments, and particular modifications thereof, it is to be clearly understood that this description is made only by way of example and not as a limitation on the scope of the invention.

What we claim is:

1. In telegraph switching system, incoming lines and respectively corresponding stores for receiving and storing telegraph messages arriving on said lines, each message comprising selection signals including a precedence marking signal and an address signal, said address signals indexing desired destinations, outgoing lines and associated individual stores for respective ones of a plurality of destinations, transferring means for immediately transferring messages stored in the incoming stores as they are received to the outgoing stores corresponding to the indexed destinations, said transferring means comprising a central store, means for recording data therein derived from said transferred messages indicative of the precedence marking signal, the order of arrival, and the outgoing store identity of each transferred message, and means for processing said data in said central store on a priority basis as long as said messages remain in said outgoing stores, so as to permit selection of messages according to their precedence and the order of arrival, and transmitting means controlled by the said central store for controlling the said outgoing stores to transmit the messages therein over associated outgoing lines in a sequence according to their respective precedence marking signals and their order of storage in the incoming line stores.

2. A telegraph switching system as claimed in claim 1, and in which the said means for recording data in said central store is arranged to record the said outgoing store identity information in the order of the storage of the corresponding messages in the outgoing line store.

3. A telegraph switching system as claimed in claim 1, and in which the said central store comprises a plurality of recording sections allocated respectively to the said precedence marking signals.

4. A telegraph switching system as claimed in claim 3 in which the said means for recording data in said central store includes means for recording therein the said outgoing store identity information in the order of the storage of the messages in the outgoing line stores.

5. A telegraph switching system as claimed in claim 3, and in which the said recording sections comprise a portion of a magnetic track, and the said central store comprises means for altering the length of each said section according to the data which is contained therein.

6. A telegraph switching system as claimed in claim 5, in which said central store comprises a track on a continuously moving magnetic surface, and said recording sections are contiguous sections of said track.

7. A telegraph switching system as claimed in claim 5 in which said transferring means includes circuit means for storing data in central stores, said circuit means comprising said central store, associated reading and writing equipment, and a multi-element shift register having normal input and output leads, said transferring means including means for connecting the output of the shift register to the intput of the central store, for connecting the output of the central store to the input of the shift register, and for modifying the circulation path within the shift register to by-pass shift register elements.

8. A telegraph switching system as claimed in claim 7 wherein the said transferring means includes means for modifying the circuit means within the shift register to increase the extent of the circuit means by the addition of shift register elements.

9. A telegraph switching system as claimed in claim 8 in which the said means for modifying the circuit means includes means for restoring the said shift register to its normal extent responsive to the operation of the said modifying means.

10. A telegraph switching system according to claim 1 wherein said transferring means includes a linking-selector circuit for selecting any one of any combination of said outgoing lines for simultaneous transmission thereover of messages received over any said incoming line.

11. A telegraph switching system as claimed in claim 10, in which said linking-selector circuit comprises detecting means responsive to the said address signals for controlling the said selection of said outgoing line over which transmission is to be made.

12. A telegraph switching system as claimed in claim 11 in which said detecting means comprises individual detectors individually responsive to said selection signals to cause the pre-emption of the said combination of outgoing lines, and individual storage devices for storing each selection until all selections are made in response to the said selection signals.

13. A telegraph switching system as claimed in claim 12, means for producing an "end of selection" signal, and actuating means in said detection means to cause the final setting up of the said pre-empted combination of lines upon receipt of said end-of-selection-signals, said transmitting means causing transmission of all said message over said combination of channels.

14. A telegraph switching system as claimed in claim 13 and in which the said linking-selector circuit comprises decoding storage equipment to store a message being transferred from the incoming store to the outgoing store, and scanning means to scan the transferred message for the presence of address signals.

15. A telegraph switching system as claimed in claim 14 in which connection is made simultaneously to a plurality of outgoing lines for the transmission of signals comprising a single message, and in which means are provided for temporarily disconnecting at least one of said plurality of outgoing lines so that certain signals of said message are not passed to all said selected outgoing lines, and means for reconnecting all said selected outgoing lines so that subsequent signals of said message pass to all the selected lines in said plurality.

16. A telegraph switching system as claimed in claim 15 in which said detecting means is responsive to a plurality of said selection signals to cause selection of a single outgoing line.

17. A telegraph switching system as claimed in claim 10 in which said outgoing lines comprise a pair of data storage and retransmission equipments for receiving and storing transferred messages alternately.

18. A telegraph switching system as claimed in claim 17 in which said outgoing lines comprise at least one group of lines for the same destination, each said group having a pair of data storage equipments for receiving and storing transferred messages alternately, the said transmitting means for causing messages from one or other of the said pair of storage equipments to be transmitted over the outgoing lines through switching means individual to said outgoing lines.

19. A telegraph switching system as claimed in claim 17 in which the said transmitting means comprises positioning means for rendering one of said pair of storage and retransmission equipments available for transmission of messages over the outgoing lines simultaneously with, or subsequently to, rendering the other of said equipments available for reception of transferred message signals.

20. A telegraph switching system as claimed in claim 19, and in which said positioning means includes means for indicating the commencement and the finish of recordings in said storage and retransmission equipments.

21. A telegraph switching system as claimed in claim 20, in which said means for indicating comprises means for adding to each recording a prefix of two supervisory signal, two-condition characters before, and a suffix of two supervisory signal, two-condition characters after, each recording, the said prefix and suffix being identical with one another, and with those in each recording.

22. A telegraph switching system as claimed in claim 21, in which said means for adding the said prefix and suffix includes means for preceding each said signal with a unique "warning" signal capable of indicating without ambiguity the existence of the succeeding prefix or suffix signal.

23. A telegraph switching system as claimed in claim 21 in which modifying means is provided for modifying the said supervisory signal characters one at a time from the first of their two conditions to the second thereof according to a predetermined programme of searching for next recording section.

24. A telegraph switching system as claimed in claim 23, in which the said modifying means is arranged to operate on one only of said supervisory signal characters during the searching programme, means for reading the other of said supervisory signal characters until one having a predetermined condition is found; and means responsive thereto for reversing the modifying and reading procedure.

25. A telegraph switching system as claimed in claim 22, in which means are provided for differentiating the said prefixes and suffixes in response to the association of the prefix marking with both the said warning signal and a precedence signal in a fixed, spatial relationship.

26. A telegraph switching system as claimed in claim 17 in which the said storage and retransmission equipment comprises magnetic tape machines.

27. A telegraph switching system as claimed in claim 26 and in which each said machine comprises means for recording on, and retransmitting from, a plurality of separate magnetic tracks.

28. A telegraph switching system as claimed in claim 26 in which means are provided for recording in each section of the central store, information regarding the first message indicated by its location indication, such information indicating the identity of the track on the said magnetic tape on which the message is stored, and the searching programme to be employed in locating it.

References Cited in the file of this patent

UNITED STATES PATENTS

| | | |
|---|---|---|
| 2,614,169 | Cohen | Oct. 14, 1952 |
| 2,667,533 | Zenner | Jan. 26, 1954 |
| 2,805,283 | Stiles | Sept. 3, 1957 |
| 2,951,893 | Krecek | Sept. 6, 1960 |